Nov. 8, 1938.   E. J. ABBOTT   2,135,485
MACHINE FOR PREPARING YARN PACKAGES
Filed Aug. 21, 1930   13 Sheets-Sheet 1
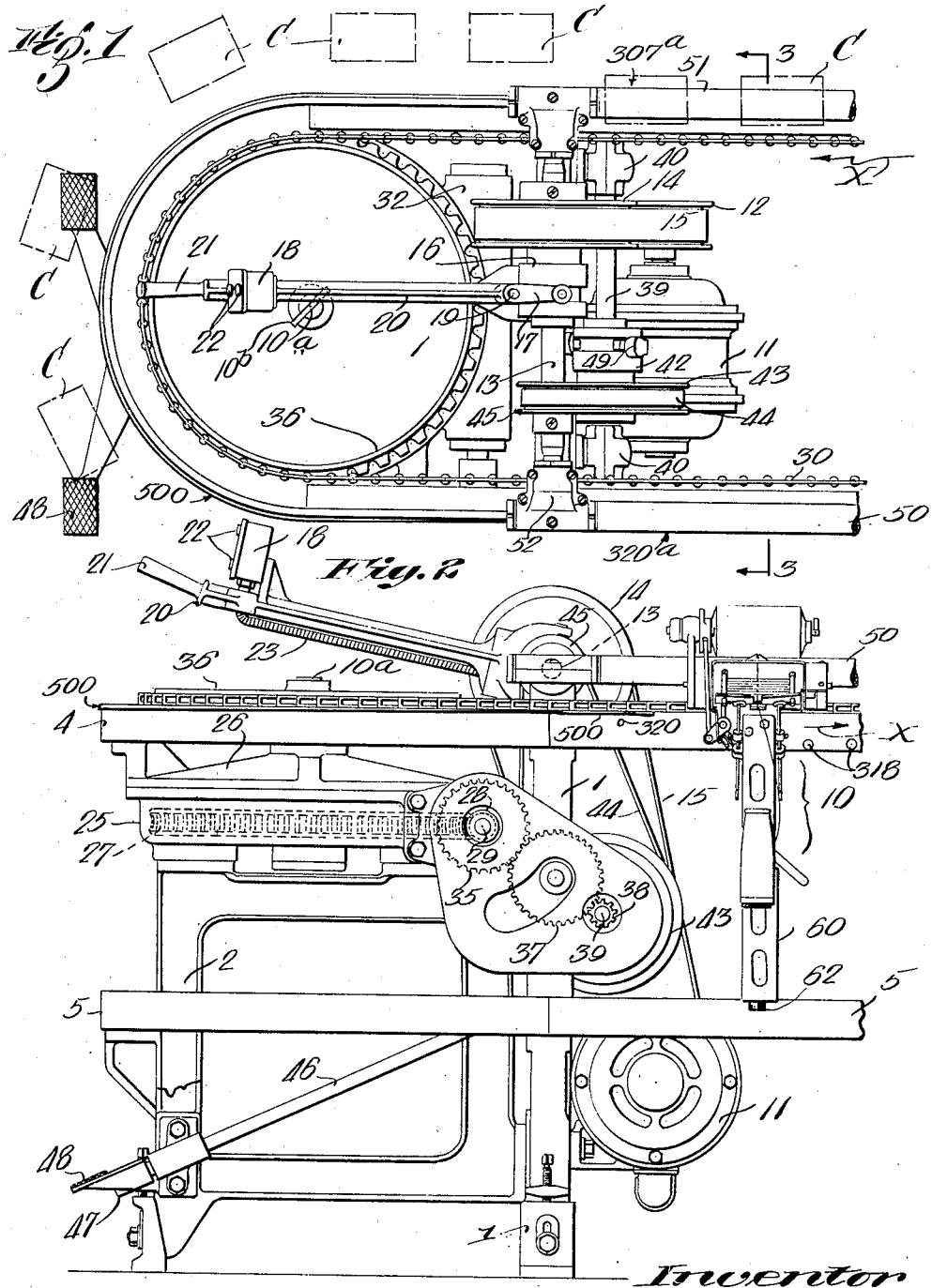

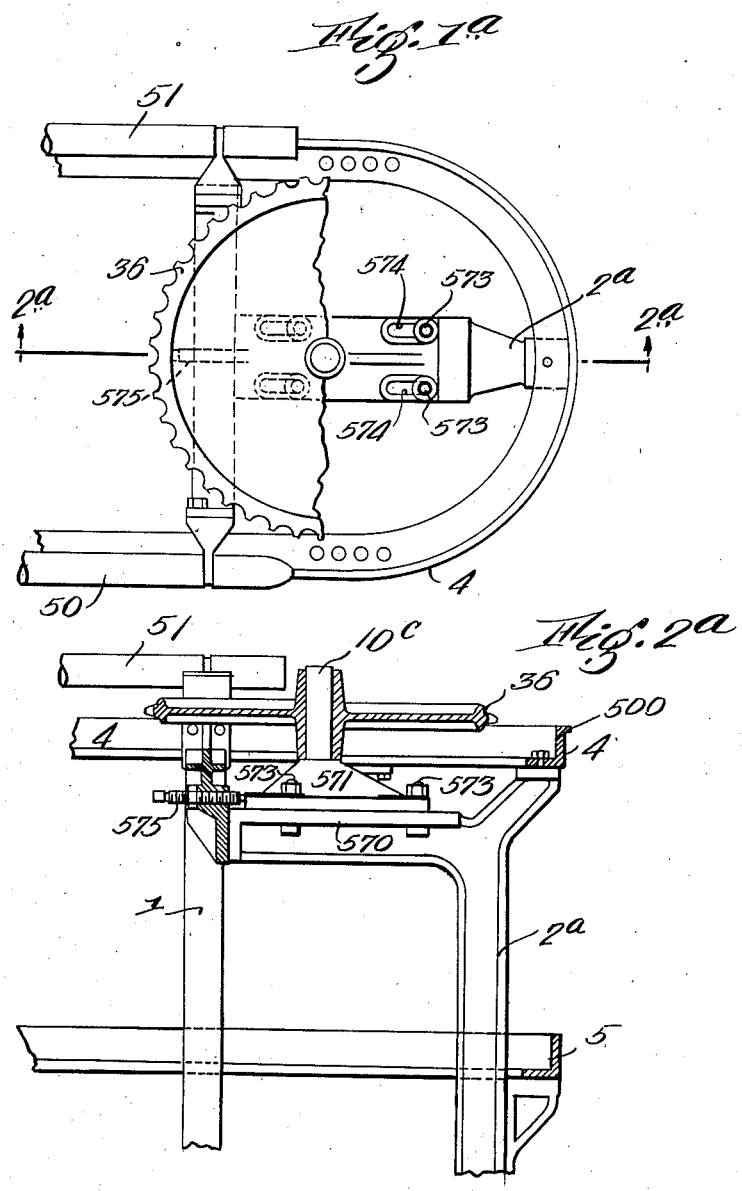

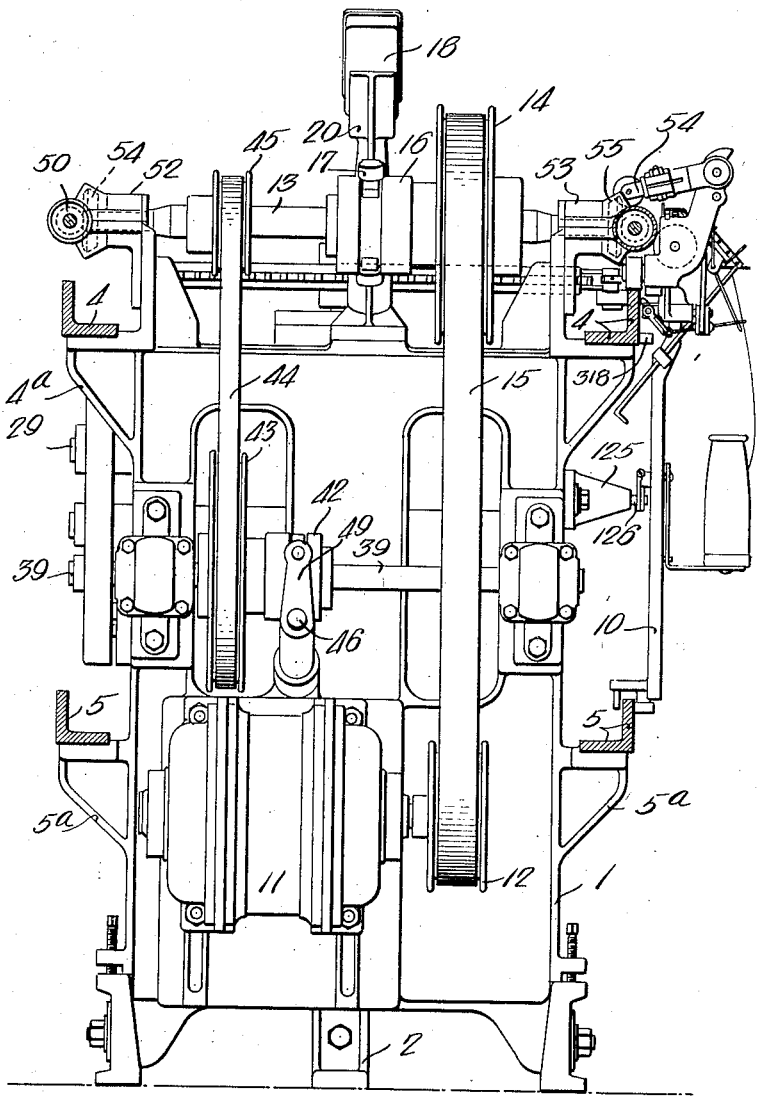

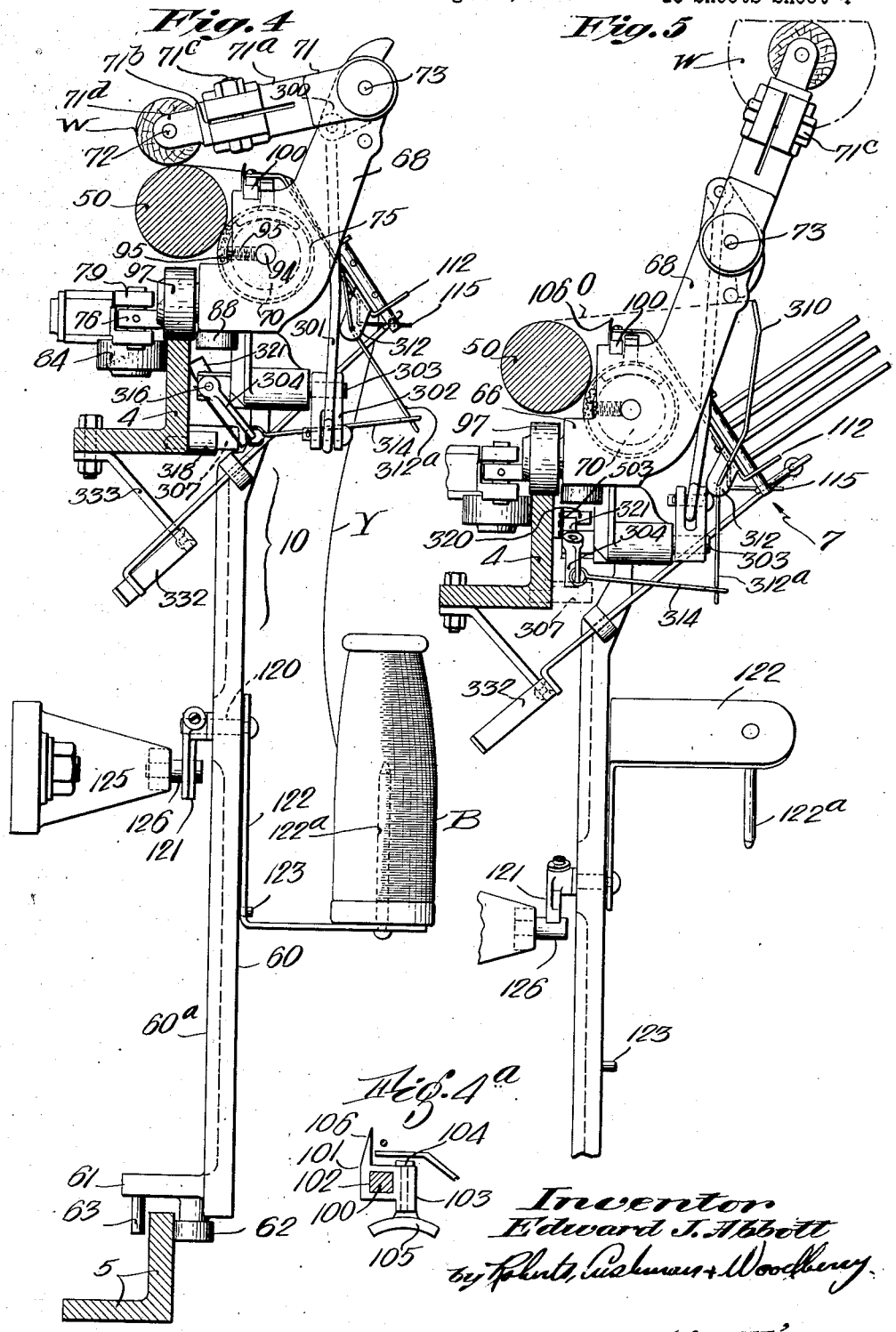

Nov. 8, 1938.  E. J. ABBOTT  2,135,485
MACHINE FOR PREPARING YARN PACKAGES
Filed Aug. 21, 1930  13 Sheets-Sheet 5
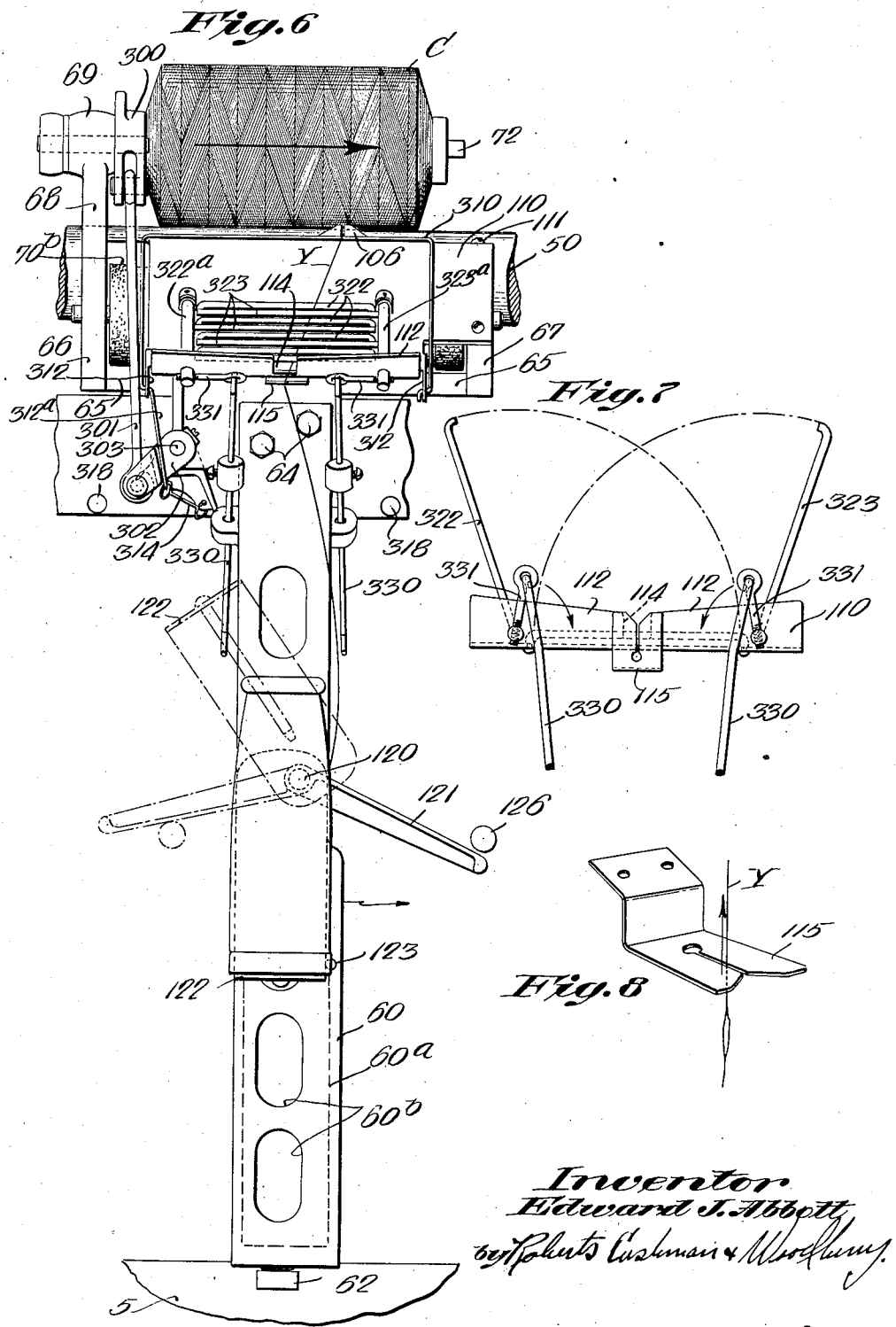

Nov. 8, 1938.   E. J. ABBOTT   2,135,485
MACHINE FOR PREPARING YARN PACKAGES
Filed Aug. 21, 1930   13 Sheets-Sheet 6
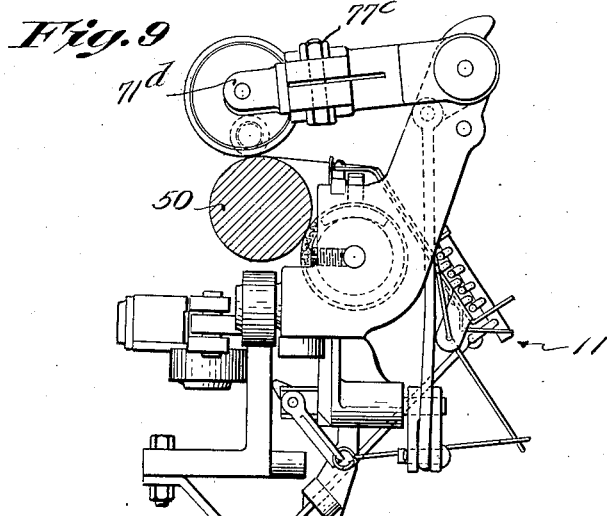
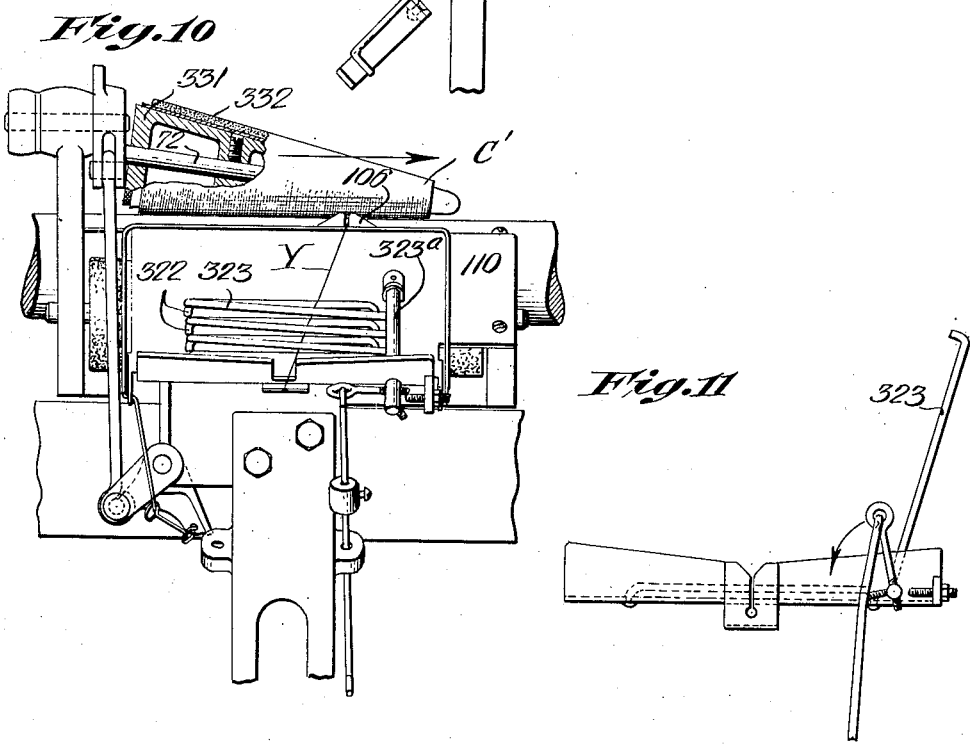
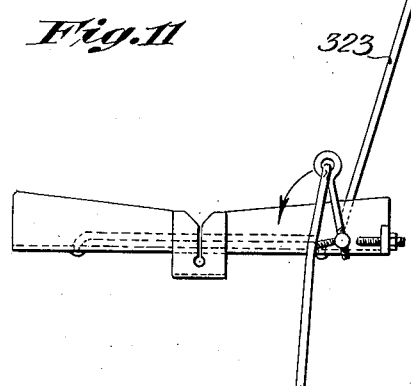
Inventor
Edward J. Abbott,
by Roberts, Cushman & Woodbury
his Attys.

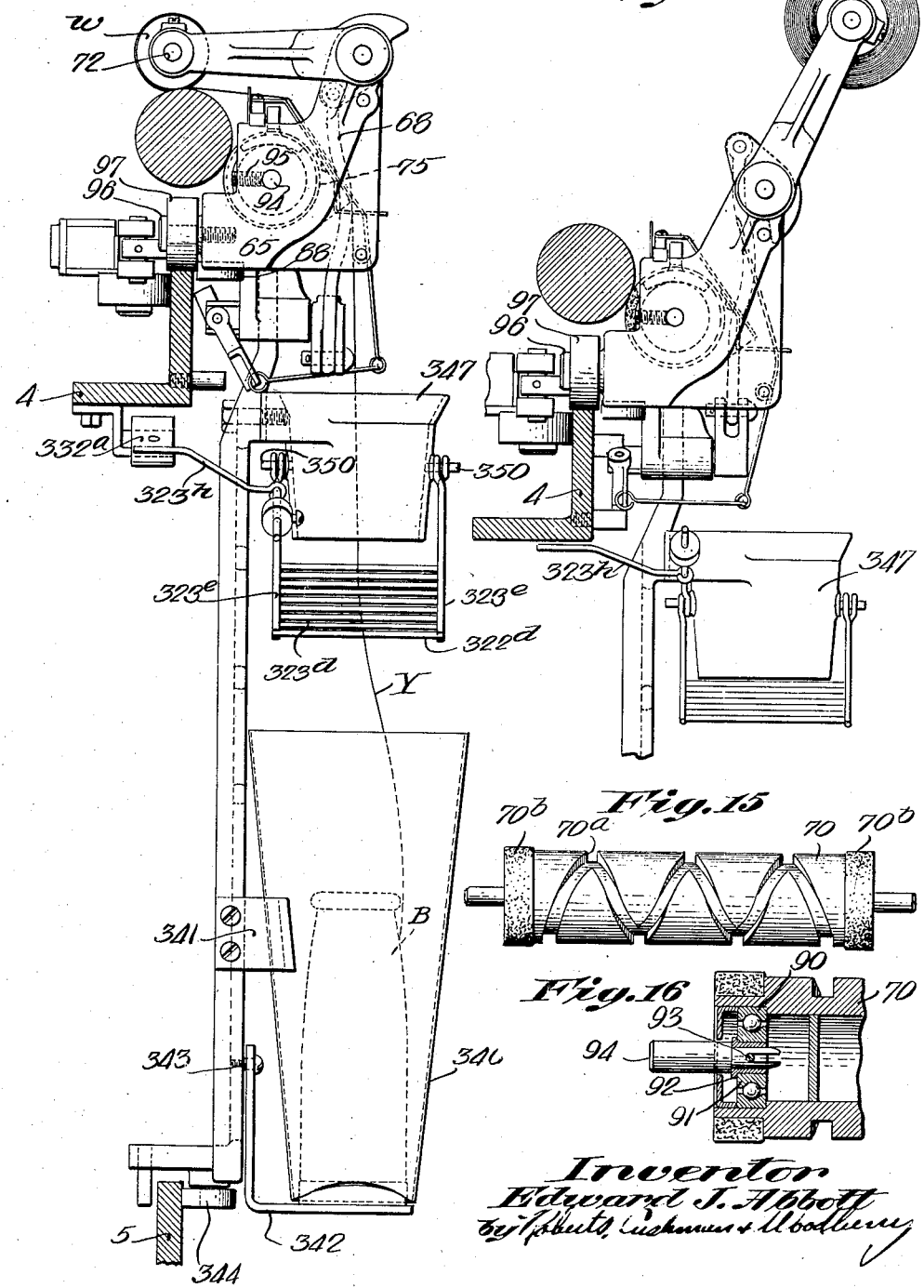

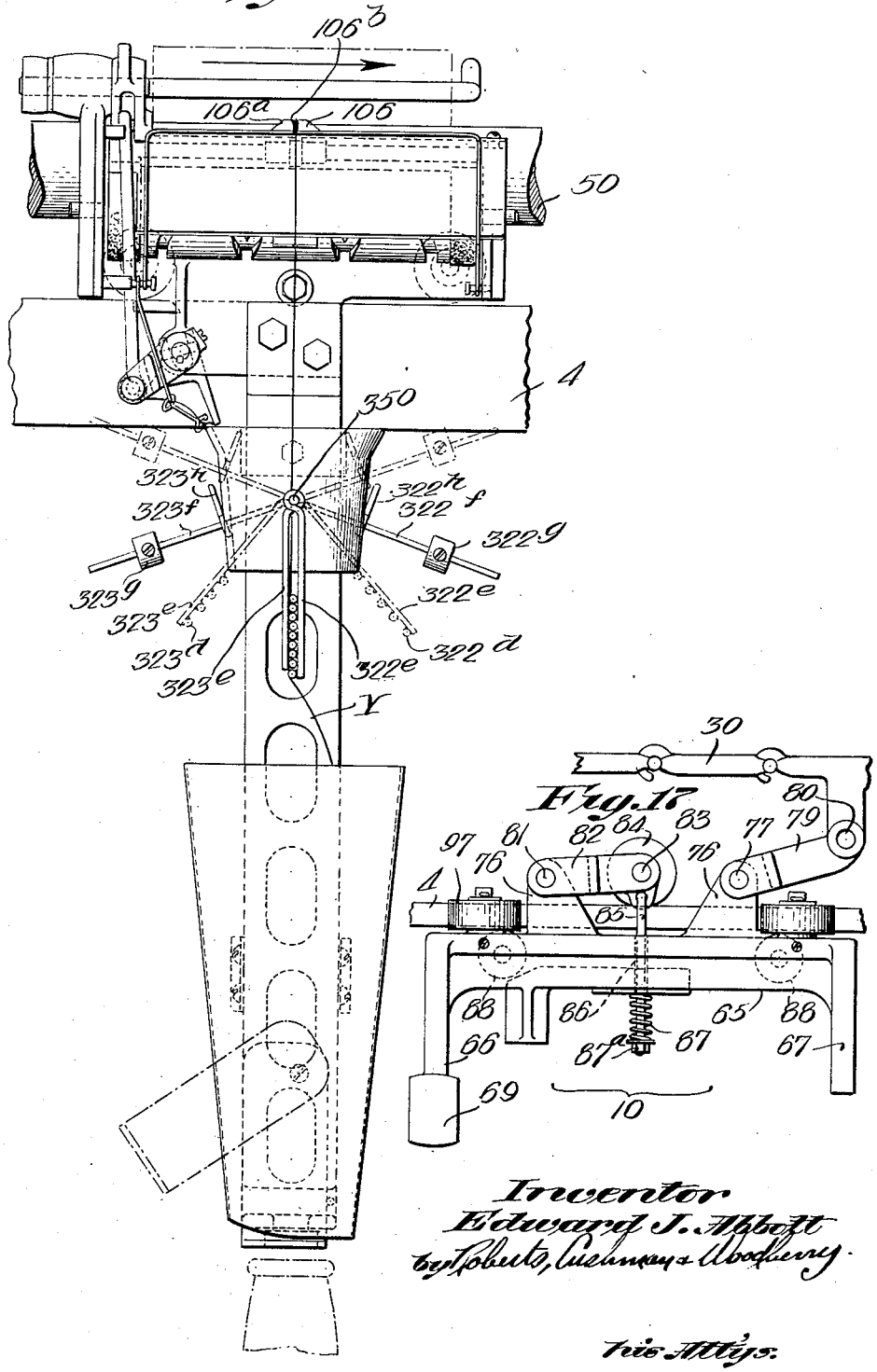

Nov. 8, 1938.  E. J. ABBOTT  2,135,485
MACHINE FOR PREPARING YARN PACKAGES
Filed Aug. 21, 1930  13 Sheets-Sheet 9
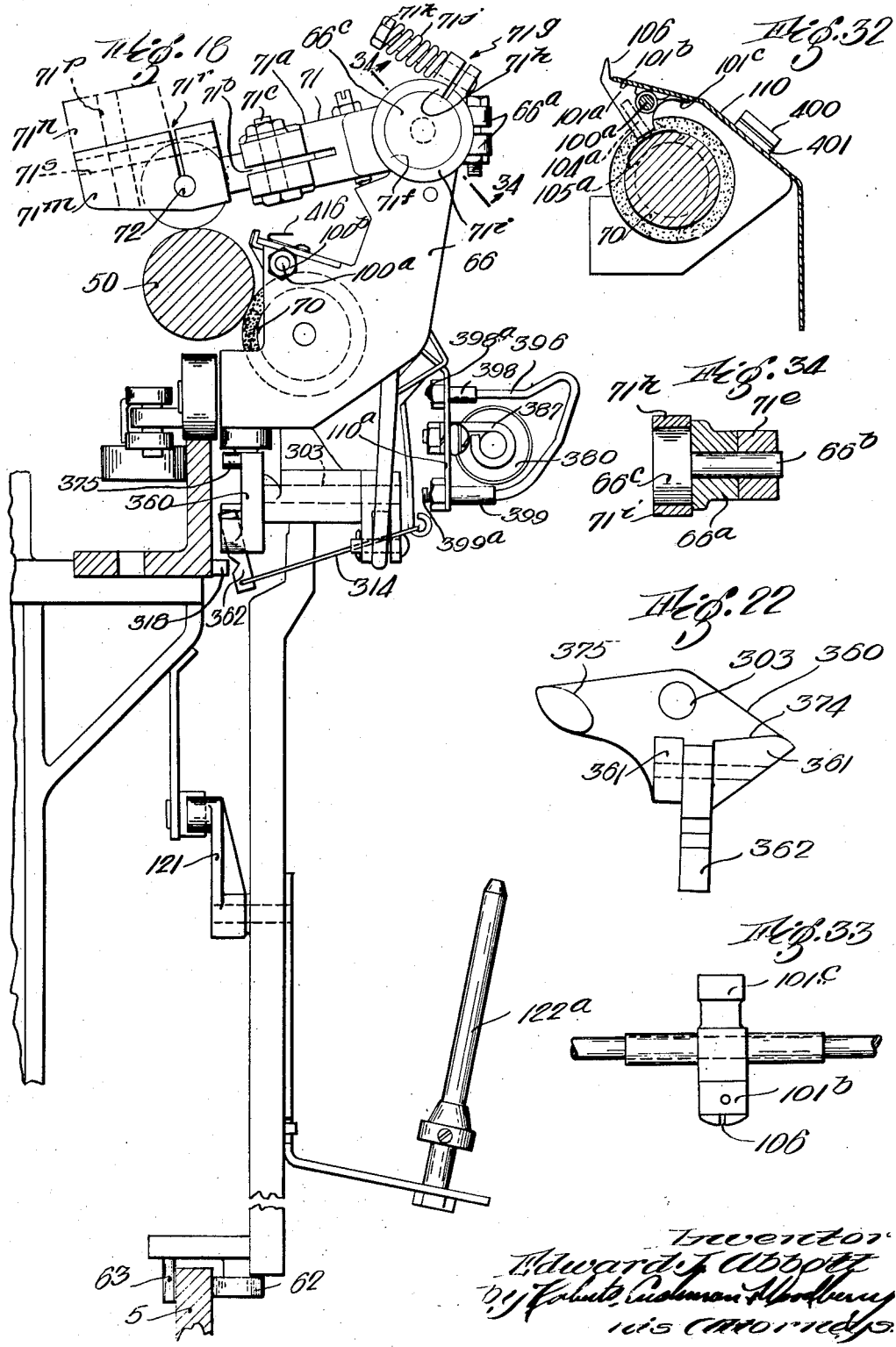

Nov. 8, 1938.  E. J. ABBOTT  2,135,485
MACHINE FOR PREPARING YARN PACKAGES
Filed Aug. 21, 1930  13 Sheets-Sheet 10
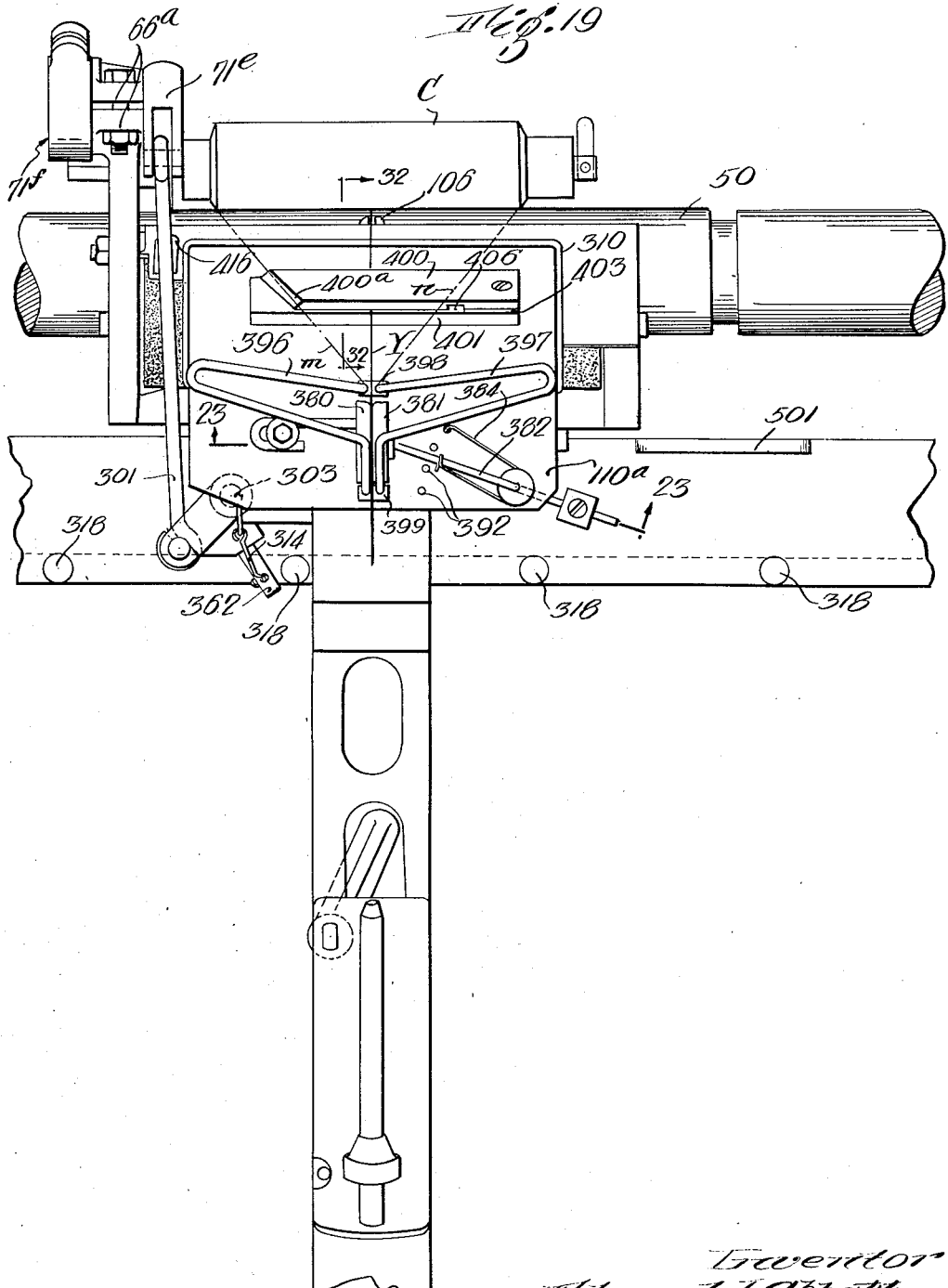

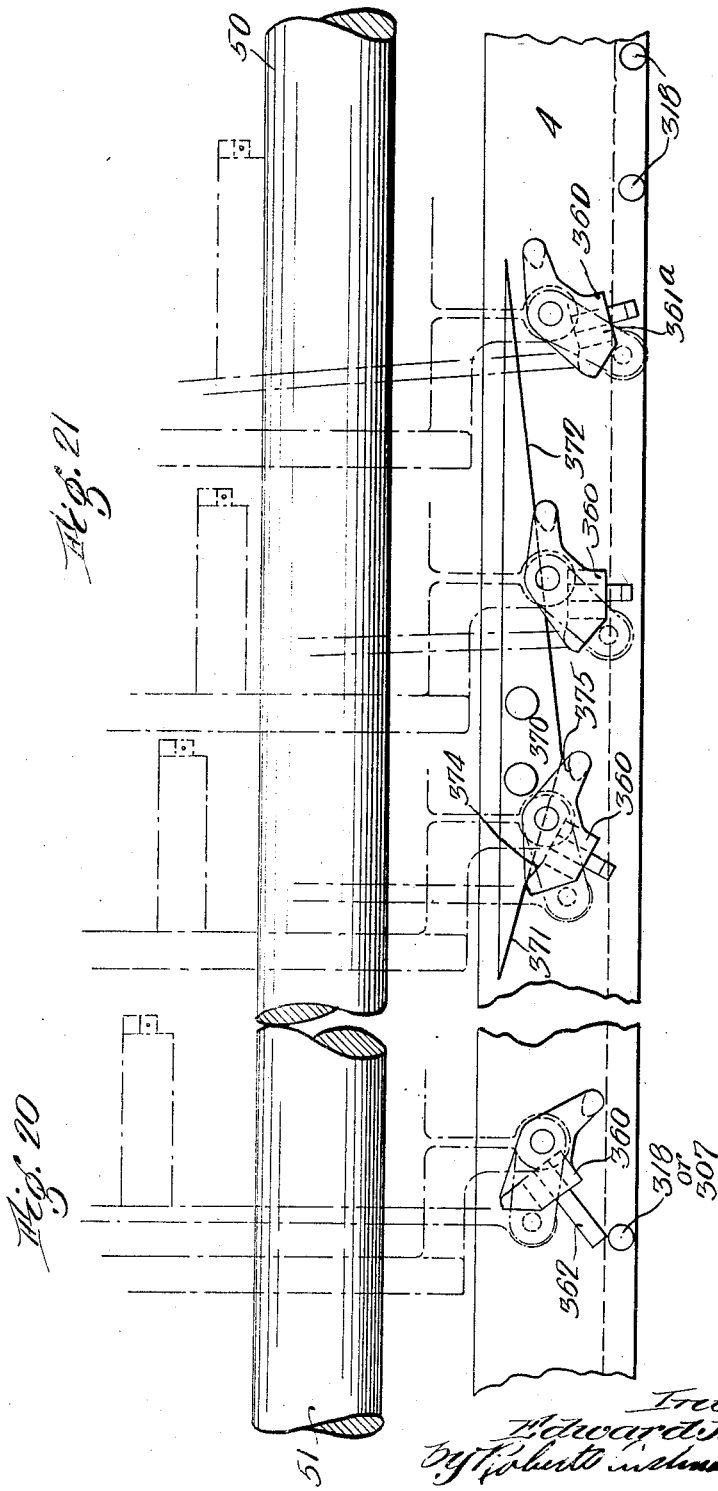

Nov. 8, 1938. E. J. ABBOTT 2,135,485
MACHINE FOR PREPARING YARN PACKAGES
Filed Aug. 21, 1930 13 Sheets-Sheet 12
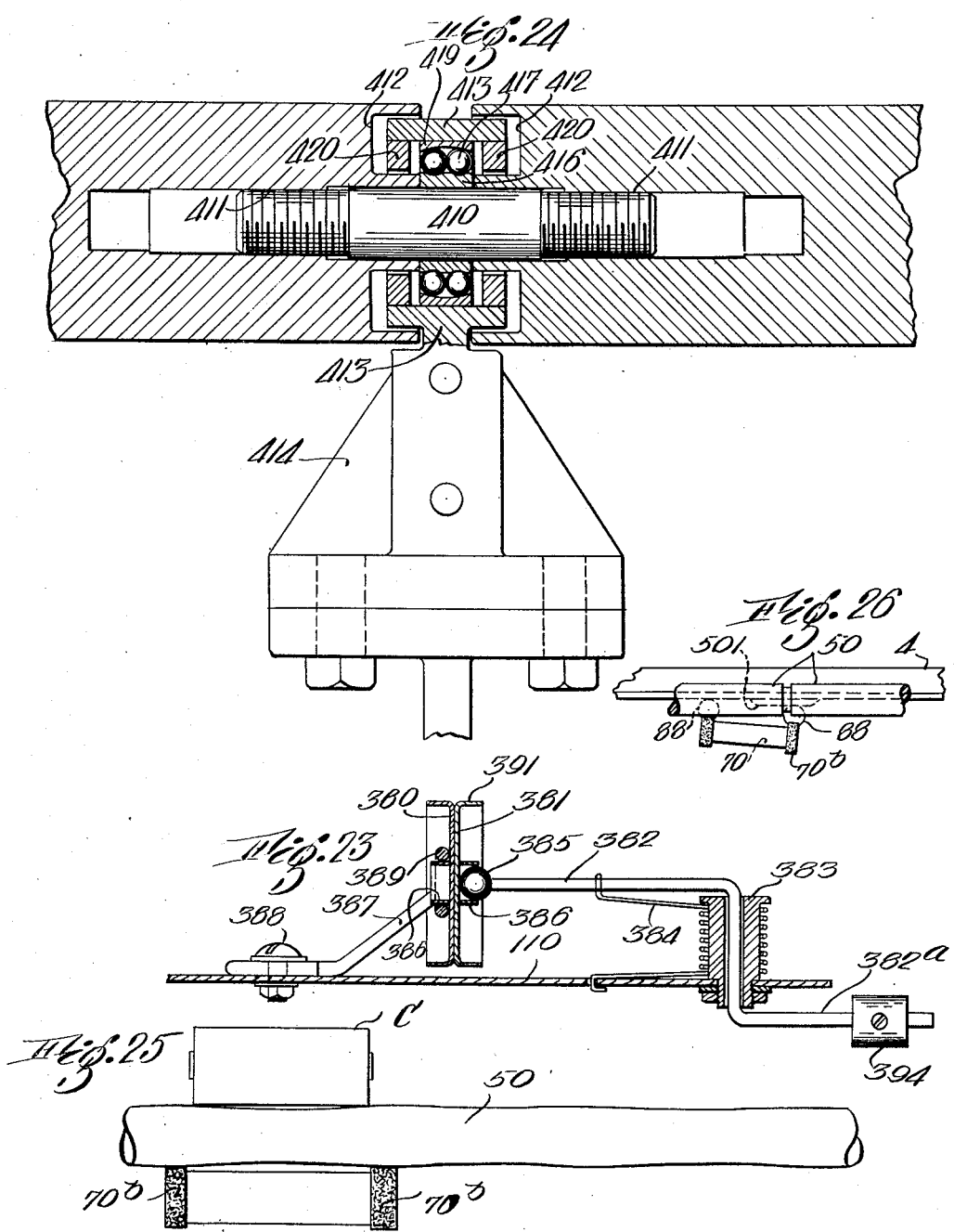

Nov. 8, 1938.　　　　　E. J. ABBOTT　　　　　2,135,485
MACHINE FOR PREPARING YARN PACKAGES
Filed Aug. 21, 1930　　　13 Sheets-Sheet 13
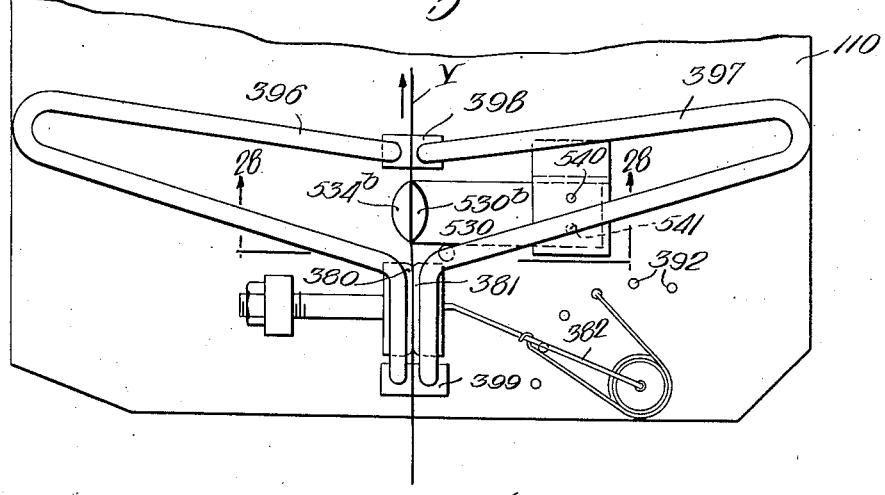
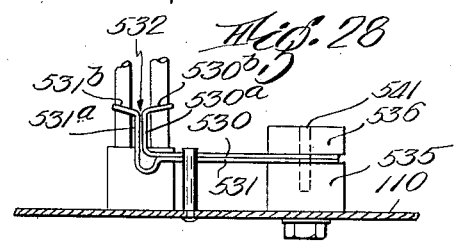
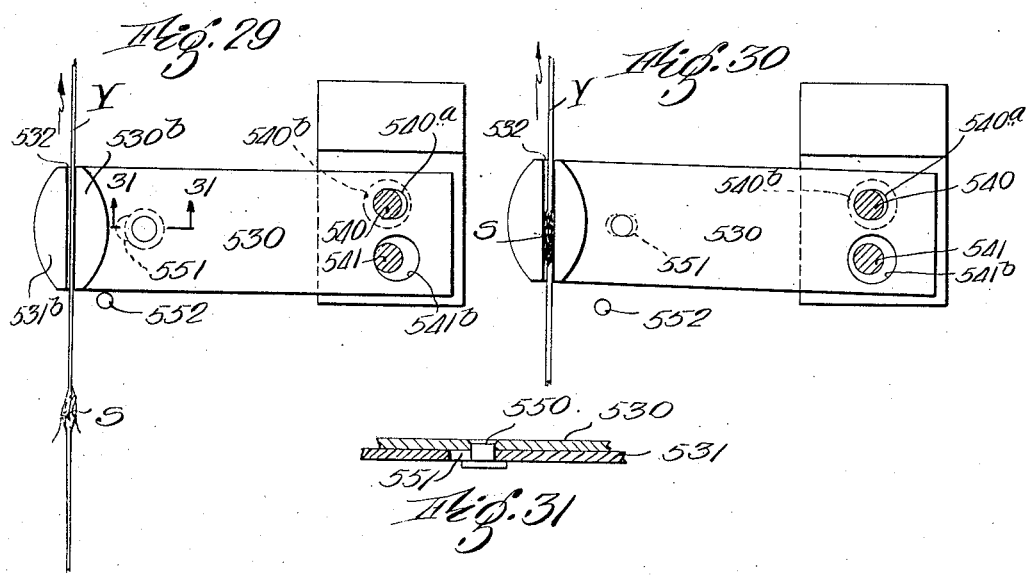

Patented Nov. 8, 1938

2,135,485

UNITED STATES PATENT OFFICE 2,135,485

MACHINE FOR PREPARING YARN PACKAGES

Edward J. Abbott, Wilton, N. H., assignor to Abbott Machine Company, Wilton, N. H., a corporation of New Hampshire Application August 21, 1930, Serial No. 476,776

89 Claims. (Cl. 242—35.5)

This invention relates to textile machines and especially to winding, doubling, twisting or spinning machines of the type comprising means for winding a wound mass or package of yarn, thread or other filaments, hereinafter referred to as yarn. The invention will be explained as embodied in a machine capable of preparing traverse wound headless self sustaining cops, balls or cheeses, cylindrical or conical, built up, as usual, of layers of yarn lying in spiral or helical formation, reversals of the direction of pitch of winding occurring at the unsupported end faces constituted of these reversals. Such a package is suitable for warp, for weaving, for rewinding into other packages, for direct use in warping, knitting, sewing, braiding, or other yarn-using machines, or as weft for a continuous weft loom.

One object of this invention is to provide a machine requiring a minimum of attendance adapted simultaneously to wind at high speeds self-sustaining headless packages comprising the wound lengths of yarn of a plurality of different spinning bobbins or other primary unwinding containers wound in succession to form the headless package. Another object of the invention is to provide a machine of this character and for this purpose adapted to transport the yarn masses past an operator at a fixed station, which shall be adapted simultaneously to operate for winding a large number of winding carriers, and at least the same number of unwinding carriers each serving a winding carrier; and further to provide automatic means for detecting breakage or exhaustion of the unwinding supply and to provide means for cessation of actuation of the winding carriers severally when such a condition is detected. Another object of the invention is to provide pairs of unwinding and winding carriers each with a detector adapted to stop winding on the occurrence of a knot, bunch, snarl or slub, hereinafter referred to as a slub, and to prepare the winding and unwinding carriers for resumption of winding when a detected slub has been removed, or when a detected exhaustion or breakage has been remedied by uniting the breaking end of a broken supply yarn or the leading end of a replenishment unwinding package to the following end of the yarn on a winding carrier. Such preparation may include doffing of spent supply bobbins preparatory to replenishment, cessation of winding of full packages, and positioning of stopped or full winding packages for piecing up or doffing at or near the operator's station.

Still further objects of the invention are to provide the devices and perform the operations indicated in respect to winding and unwinding carriers traveling in a circulatory path in respect to the frame of the machine, so that circulatory couples of unwinding and winding carriers may proceed from an operator's station along an outgoing part of the path of motion away from the operator and return toward the operator's station, whereby stopped winding carriers may be carried to the operator's station in optimum condition for the attention of the operator; or, if desired for the function of automatic replenishment and end uniting devices, for example such as those shown, described and claimed in the application of Edward J. Abbott and William G. Abbott, Jr. for Letters Patent of the United States for Automatic winding machines filed December 7, 1926, Serial No. 153,132 (Patent No. 1,700,425 dated January 29, 1929), which machine is in turn an improvement on my Letters Patent No. 1,609,639 dated December 7, 1926, further improved by this invention.

Further objects of the invention are to provide improved subordinate agencies for supporting winding and unwinding yarn carriers; to provide improved tension, stop motion and slub catching devices; to provide improved driving means for operative motions of traverse guides adapted to lay the yarn on the winding carrier in reversing quick-pitch spirals and improved controlling means for the traverse guides, and to provide winding package carrier and positioning means adapted to position winding or unwinding packages for manual operation or for automatic operation for the correction of the condition of the yarn supply or its replenishment, and to provide a machine indifferently adapted to wind conical or cylindrical packages.

Other objects of the invention are to provide improved devices for jointly controlling the progression of the carriers and winding of the yarn and for separately controlling the progression of the carriages; to provide improved agencies for controlling the movement of the winding packages into and out of winding position; to provide improved carriers for machines of this type; to provide suitable coordination between beginning of winding and beginning of traversing of the yarn; to provide tractor rolls improved as respects the bearings and joints between sections of the roll; to provide for preventing the occurrence of the phenomena of ribbon wind; and to provide in a machine of the present type means for governing the tension devices in accordance with progression of the carriers.

Further objects of the invention are to provide an improved conical wound package and a method and mechanism for producing this package, and particularly to provide an improved tension device for use in winding in conical layers.

Other objects of the invention, improvements and features of advantage will appear from a consideration of specific instances of the invention explained herein and shown in the accompanying drawings by way of example.

In the drawings:

Fig. 1 is a fragmentary plan view showing the left or operator's end of the machine;

Fig. 2 is a side elevation corresponding to Fig. 1;

Fig. 1a is a fragmentary plan view partly broken away, of the end of the machine opposite to the operator's end, the carriers and their driving chain being removed;

Fig. 2a is a fragmentary vertical section on the line 2a—2a of Fig. 1a;

Fig. 3 is an elevation, partly in section on the line 3—3 of Fig. 1 showing the left-hand end of the machine;

Figs. 4 and 5 are corresponding detail elevations, partly in section at right angles to the longitudinal axes of the machine and to larger scale than Fig. 1, respectively, showing different positions of a winding package spindle carrier, the breakage and exhaustion detector devices, and spent bobbin doffing devices;

Fig. 4a is a vertical section to larger scale than Fig. 4, showing details of the yarn traverse guide;

Fig. 6 is a right side detail elevation of the parts shown in Fig. 4 and to the same scale;

Fig. 7 is a fragmentary detail elevation in the direction of the arrow 7, Fig. 5, omitting many parts;

Fig. 8 is a detail perspective of a slub catching yarn guide;

Fig. 9 is a view on a scale corresponding to Figs. 4 and 5 showing a modification adapted for cone winding;

Fig. 10 is a right side elevation of the parts shown in Fig. 9;

Fig. 11 is a detail elevation in the direction of the arrow 11 of Fig. 9;

Fig. 12 is a view similar to Figs. 4 and 9 illustrating doffing and tension devices especially applicable to a modified form of unwinding package carrier;

Fig. 13 is a right side elevation of parts shown in Fig. 12;

Fig. 14 is a right side elevation of the modified construction shown in Figs. 12 and 13;

Fig. 15 is an elevation of the rotary traverse cam of general application to machines of this type;

Fig. 16 is a detail vertical longitudinal section through the device shown in Fig. 15;

Fig. 17 is a fragmentary plan view illustrating one of the traversing carriers for winding and unwinding yarn supplies, superposed parts being removed, and particularly illustrating the rolls relied upon for guiding the carriage and tensioning the friction driving devices for a rotary traverse cam;

Fig. 18 is a view similar to Figs. 4, 9, and 12 illustrating a modified form of carrier having improved slub catching, tensioning, and yarn guiding devices and an improved form of parts adapted to initiate and control starting and stopping of winding and shifting of position of the winding mass;

Fig. 19 is a right side elevation of parts shown in Fig. 18;

Fig. 20 is a fragmentary diagrammatic view showing the carrier at a position on the machine at which the controlling parts of the carrier have been moved by a stationary contact to stop winding;

Fig. 21 is a schematic view similar to Fig. 20 and showing successive positions of the controlling parts on the carrier as these parts engage a stationary cam to cause controlled return of the winding mass into contact with the drive roll.

Fig. 22 is a fragmentary left side elevation of certain of the controlling parts of the carrier, viewed from the side opposite to that shown in Figs. 20 and 21;

Fig. 23 is a section taken on the line 23—23 of Fig. 19 illustrative of a modified form of tension device;

Fig. 24 is a sectional view showing a preferred connection between adjacent sections of the tractor rolls and the bearing provided at this connection;

Fig. 25 is a fragmentary view of a tractor roll, winding mass and traverse cam, showing, on a greatly exaggerated scale, preferred variations in diameter of the tractor roll for the purpose of breaking up ribbon wind;

Fig. 26 is a fragmentary plan view with many parts removed showing a device for causing the tires of the traverse cam to step one at a time over the joint between adjacent sections of a tractor roll;

Fig. 27 is a fragmentary side elevation showing a cover plate of a carrier and modified forms of yarn guiding, yarn tensioning and slub catching devices thereon;

Fig. 28 is a sectional view on the line 28—28 of Fig. 27;

Figs. 29 and 30 are side elevations showing the slub catcher of Fig. 27 in its normal position and in the position which it assumes in catching a slub;

Fig. 31 is a section on the line 31—31 of Fig. 29;

Fig. 32 is a section on the line 32—32 of Fig. 19, showing an improved arrangement of the traversing slider and traverse cam plate;

Fig. 33 is a plan view, with parts removed, showing the traversing slider of Fig. 32 and its guide rod; and Fig. 34 is a section on the line 34—34 of Fig. 18.

Figs. 1, 2 and 3 illustrate the machine in its preferred form, which, in the general arrangement of its parts and in general function, may resemble the machine disclosed in my above mentioned Patent No. 1,609,639 and in the said patent of Edward J. Abbott and William G. Abbott, No. 1,700,425. Thus in common with the machines of these patents the present machine comprises longitudinally extending tractor rolls 50 and 51 adapted to be continuously rotated while the machine is at work, the tractor rolls preferably being formed in separable sections, and may further include means for circulating a series of winding package carriers and unwinding yarn packages about the machine. Said means in a preferred form comprises carriages 10, each provided with a device for supporting the winding package and each provided with a device for supporting an unwinding supply package, each of said carriages being driven by appropriate means to circulate about the respective ends of the machine and longitudinally of each of the tractor rolls 50 and 51, the winding operation being performed during travel of the winding package carriers in sliding contact with the surface of the tractor rolls.

Travel of the carriages 10 may be appropriately induced, for example by the endless chain 30 constructed and adapted to operate according to my said patent, and guided by sprocket wheels 36 at each end of the machine (Figs. 1, 2, 1a and 2a). The left end of the machine shown in said figures is the preferred station of the operator, when the machine is not wholly automatic. Driving and control devices for the mechanically actuated parts may therefore be concentrated at said end of the machine. The construction and operation of the machine will be most readily followed from a brief description of its agencies.

*Driving and power devices.*—In the preferred form shown, the machine may be built upon spaced transverse frames 1 and end frames 2 suitably joined together by any kind of longitudinal struts; for example by the upper and lower carriage positioning rails 4 and 5 (which, as best shown in Fig. 3), may be L-channels carried on suitable lugs 4a, 5a of the transverse and end frame members. The curved end sections of the rails 4 and 5 are central upon the axes of the vertical shafts carrying the sprocket wheel 36 and the corresponding sprocket wheel at the other end of the machine (not shown). The sprocket wheel 36 at the operator's end of the machine is preferably the driving member of the system comprising the chain 30, the wheel 36, and the similar wheel at the other end of the machine, and the short vertical shaft 10a upon which the wheel 36 is fast is driven by means under appropriate control of the operator. Preferably shaft 10a and sprocket wheel 36 are connected by a frangible connection, herein shown as a shear pin 10b, adapted to break in the event that progression of the carriages is unduly obstructed, thus to prevent breakage of the chain or other parts of the machine.

As shown, the primary source of power is preferably an electric motor 11 mounted on one of the frames 1 and having a transverse shaft carrying a driving pulley 12 at one end. A countershaft 13 (Fig. 1) turns in housing brackets 52 and 53 at the top of the frame 1. This shaft 13 is provided with a free pulley 14 actuated by a belt 15 and adapted to be connected to the shaft by means of a shiftable clutch member 16 splined to the shaft 13. The clutch member 16 is operated by a pin fork 17 on a clutch lever 20 mounted on a slanting pivot 19. On the lever 20, which may have a handle 21 projecting toward the operator, is a switch box 18 within convenient reach of the operator's hands. This box has stop and start buttons 22 for the motor circuit housed in a conduit 23 (Fig. 2).

The shaft 10a is held in suitable bearings at the top and bottom of a hollow housing comprising a casing 25 attached to the end frames 2, said casing having a cover 26. Within the housing the shaft 10a carries fixed thereto a worm wheel 27, meshing with worm 28 on a transverse shaft 29, housed within a hollow projection 32 of the casing 25. This hollow projection is provided with suitable end and thrust bearings for the shaft 29 which projects outside of the part 32 at one end to receive a gear 35 of a train including an idler 37 meshing with a pinion 38 on a countershaft 39 having bearings in brackets 40 (Fig. 1) on the frame 1.

Keyed on the shaft 39 is a clutch element 42 adapted to lock to or release from said shaft a pulley 43 carrying a driving belt 44 which engages a driving pulley 45 on the shaft 13. The shaft 10a is thus driven at low speed as compared with that of the motor shaft through the driving connections 12, 14; 45, 43; and the gear train 35, 37, 38. To actuate the clutch element 42 I mount a shaft 46 in bearings carried by the frame, said shaft 46 having a T-head 47 carrying pedals 48, 48 for the operator's feet. At its inner end the shaft 46 carries a clutch shifting fork 49 engaging a groove in the clutch element 42. By operating the pedals 48, the operator is able to stop or start motion of the shaft 10 and control the progress of the chain 30 and elements driven thereby, as distinguished from control of all of the agencies of the machine by manipulating the stop and start buttons 22. By shifting the stop lever 20 the operator is able to idle or actuate the shaft 13 which controls the actuation both of chain 30 and of the tractor rolls 50 and 51.

In order to drive the tractor rolls (referring now more particularly to Fig. 3) reduced ends of the shaft 13 enter the housings 52 and 53 which are also provided with bearings for the reduced ends respectively of the rolls 50, 51. The reduced ends of the shaft 13 (Fig. 3) carry bevel pinions 54 and 55 respectively meshing with bevel pinions integral with or fast on the ends of the rolls 50 and 51 respectively. It will be perceived that shaft 13 drives the chain 30 and also the rolls 50 and 51, and manipulation of clutch element 16 by handle 20 is effective to stop both the winding drive and the circulation of the winding carrier carriages. On the other hand the treadles 48 may be relied upon to stop and start the motion of the chain 30 only. In normal use, when the machine is manually controlled, it may often be desirable to stop the motions of the winding carriages past the operator without stopping the winding on all of the winding carriers in contact with the tractor rolls 50 and 51 along both sides of the machine; by stopping the progress of the bobbins unusual conditions can be provided for by allowing the operator as much time as is necessary to correct any abnormal condition as the winding carriers pass her. Normally, however, there is ample time in passing by the operator's station to perform any necessary operations, such as replenishing the unwinding supply, doffing full wound packages, and piecing up broken ends.

The chain 30 for circulating the carriages 10 may be of any desired construction, for example that shown in either of the above patents.

*The winding and unwinding yarn package carriers.*—Referring to Figs. 2, 3, 4, and 5, 6, 15, 16, and 17, the unwinding and winding packages are arranged to be traversed around the machine in the direction of the arrows X in Figs. 1 and 2 by motion of the chain 30. Each carriage 10 for the winding and unwinding packages of a pair comprises an upright portion or plate 60 adapted to bridge the distance between the rails 4 and 5 and provided at its lower end with a projection 61 carrying a stud on which is mounted an antifriction roll 62 and a steadying pin 63, roll 62 and pin 63 embracing between them the vertical flange of the rail 5.

At its upper end the plate 60 (see Fig. 6) may be integral with or attached to an upper head portion 65 of the carriage 10, for example by bolts 64. The plate 60 may, if desired, be of light construction comprising side flanges 60a and being provided with openings 60b.

The head 65 has outwardly projecting parallel end plates 66, 67 spaced apart to provide room between them for a rotary traverse cam 70 (Fig. 15). One of the end plates of the head 65 may be extended as shown at 68 to provide a bearing 69 for a stud 73 on a lever arm 71 carrying a spindle 72 for the winding core or carrier w.

The length of the lever arm 71 is such as to bring the surface of winding carrier w or the winding thereon always into surface contact with one of the rolls 50 or 51 adjacent to which the carriage 10 is being traversed. The offset position of the center 73 is such as to provide an arm 71 long enough to sweep a sufficient arc for the expected radius of the carrier w and the winding upon it. In normal operation the weight of the arm 71 and its attachments holds the winding mass firmly in frictional contact with the upper surface of the tractor roll 50 or 51.

For purposes presently mentioned, the arm 71 may be made in parts, comprising a tubular portion 71$^a$ split at 71$^b$ and having lugs bored for a pinch bolt 71$^c$, the tubular clamp so formed taking over an end piece 71$^d$ carrying the spindle 72. On loosening the pinch bolt 71$^c$ the part 71$^d$ may be universally adjusted to vary the distance between centers 73 and 72 and also to vary the angle of the spindle 72 from parallelism with the axis of the roll 50 or 51 to the angle of a cone carrier, as mentioned below in connection with Figs. 9 and 10.

Referring now to Fig. 17, the head portion 65, including end plates 66, 67, of the carriage 10, is arranged to have limited motion toward and away from the tractor rolls 50, 51 for the purpose of providing freedom in respect to the rail 4 and the roll 50 or 51, for accommodating curvatures at the end of the machine, and to enable the traverse cam 70 to be provided with bearings without lateral freedom of motion, provision being made for resiliently urging the upper part of the carriage toward the tractor roll, thereby holding the rotary traverse cam in frictional driving contact with the tractor roll. As best shown in Figs. 4 and 17, the head 65, preferably an integral casting, is provided not only with the outstanding end members 66 and 67, but is also provided with rearwardly projecting lugs 76 above the plane of the rail 4, said lugs being vertically bored. The bore in one lug 76 receives a pin 77 in bores in the forked end of a link 79 having a bearing hole at its other end to receive a pivot pin 80 carried by the chain 30. The bore in the other lug 76 receives a pin 81 on which is pivoted a link 82 carrying a vertical axle pin 83 for an anti-friction roll 84. Link 82 is provided with a lug into which is hooked a tractor rod 85 extending through a bore 86 in the head 65 and provided with a spring 87 adjustable by a nut 87$^a$. The spring 87 urges the roll 84 toward the head 65 and against the interior or rear vertical face of the rail 4.

Inward or rearward motion of the head 65, thus induced, is limited by anti-friction rolls 88, 88 on vertical downwardly projecting studs disposed respectively near opposite ends of head 65 and bearing against the outer face of the rail 4. It will be observed that the contact points of the rolls 88 are laterally separated from the bearing point of the roll 84; this permits a controlled position of the upper end of the carriage 10 in respect to the curved parts of the rail and normally permits freedom between the rolls 88 and the roll 50 or 51 sufficient to permit the spring 87 to hold the traverse cam 70 in pressure contact with the tractor roll 50.

Referring now to Figs. 15 and 16, the traverse cam 70 may be a cylindrical barrel having therein an outer ball race 90 taking over a series of balls supported by an exterior groove in a stationary inner race 91 provided with a nipple 92 carrying a cross pin 93 to take over the forked and reduced inner end of a pintle 94 which may be fixedly set in a hole in the member 68 of the head 65, as by a set screw 95. Preferably both ends of the barrel are provided with similar bearings, the pintle 94 at the opposite end of the barrel being secured in an opening in the member 67 of the head 65. This arrangement is such that yarn or fly does not tend to work around the pintle 94, since the latter is stationary.

The traverse cam 70 is provided with a crossed spiral cam groove 70$^a$, preferably of rectangular cross section, and at each end the cam 70 may be provided with a friction ring 70$^b$ of cork, cork composition, felt, rubberized felt, rubber aggregated ground cork, or any other durable friction material, said rings projecting slightly beyond the cylindrical surface of the cam body.

On the back face of the head 65 at points suitably laterally separated, studs 96 may be provided to carry anti-friction rolls 97 which rest on the top surface of the rail 4, and support the weight of the carriage.

*Traverse guide.*—To wind a cylindrical cheese, cop, or package such as that shown at C in Fig. 6, or to wind a conical cop or package such as that shown at C$^1$ in Fig. 10, it is requisite to lead the yarn onto the surface of the winding package in a quick-pitched spiral reversed to form a cusp in the lay of each yarn at the ends of the layers, said cusps collectively constituting the ends of the headless cheeses or packages. This implies a rapidly moving traverse guide, to move which the barrel cam 70 is rotated at a surface speed nearly the same as that of the tractor rolls 50 and 51, which drive the winding package at a suitable winding speed. It will be understood that the winding speed is a relatively high speed and it is most important to reduce the mass of the reciprocated parts to a minimum.

Referring to Figs. 4, 4$^a$, and 6, the head 65 carries the square polished steel bar 100 united at its ends to the plates 66 and 67 respectively and forming a slideway for a light casting 101, preferably of an aluminum alloy, having a square opening at 102 for a slide bearing on the bar 100 and provided with a vertical lug 103 bored for a headed pintle 104 having secured to its lower end an arcuate follower 105 engaging the cam groove 70$^a$ of the cam 70. Integral with the casting 101 is a yarn guide 106 having lateral cam slopes 106$^a$ (Fig. 14) and a central yarn notch 106$^b$.

The head 65 is preferably provided (see Fig. 6) with a sheet metal cover plate 110 comprising a substantially flat horizontal portion overhanging and spaced from bar 100 and having a straight edge parallel with the axis of the motion of the cam 70 and the tractor rolls. The cover plate also comprises a part which slopes downwardly and outwardly as indicated in Figs. 4 and 5. As best shown in Figs. 4 to 7 inclusive, the plate 110 is upturned to form a flange 112 interrupted to form a central yarn gate at 114. The yarn Y feeding from a supply package mounted on the lower part of the carriage passes through the gate 114. If it is desired to inspect the yarn for slubs, a slotted blade 115 (Fig. 8) may be fastened on the under side of the cover plate 110 to receive in its slot the yarn passing upwardly to the gate 114, said blade operating in well known manner as a stop for slubs moving with the yarn. By providing a traverse cam rotatable about an axis fixed with respect to the carrier 10, and causing the traverse cam to bear against the tractor roll, as in the device explained above, the traverse eye may be relied upon to assume during winding a constant relation with respect to the nip or bite of the tractor roll and the winding package, and thus lay the yarn evenly on the package at high speeds.

Adjustment of the drive chain

The provision of the link 79 pivotally mounted at one end on the chain 30 and at the other end on the carrier, permits the distance from the carrier to the chain to be varied. This capability is of advantage in permitting an improved construction for adjusting the length of the chain 30 or the distance between sprocket wheels 36, without necessarily moving either semi-circular end portions of the guide rails 4 and 5, or either end portion of the frame. Referring to Figs. 1a and 2a which show the end of the machine opposite to the operator's end, the machine includes an end frame 2a generally similar to the opposite end frame 2, and suitably fastened to one of the frames 1 of the machine. End frame 2a is preferably provided with a horizontal slide bearing 570 for a slidable block 571 carrying a vertical shaft 10c for the sprocket wheel 36 at this end of the machine. Suitable bolts 573 passing through slots 574 in the block 571 are adapted adjustably to secure the block 571 to the bearing 570, and a screw 575 turning in the adjacent frame 1 and bearing against the block 571 is adapted to be screwed in and out to determine the position of the block 571 and sprocket wheel 36 longitudinally of the machine. Thus, variations in the length of the chain 30 may be compensated for independently of the rails 4 and 5 and end frame 20 of the machine. Accordingly no provision need be made for permitting movement of the end sections of these rails as in my Patent No. 1,609,639. The above-described link connection between the chain 30 and the carriers 10 permits the carriers to pass freely around the end of the machine without binding even though the sprocket wheel is moved considerably toward or from the adjacent curved portions of the guide rail 4.

Devices for controlling position of the traverse cam

As each carrier reaches the end of a tractor roll 50 or 51, it is desirable to remove the tires 70b of the traverse cam roll 70 from the tractor roll to permit the cam to pass the end bearing of the roll without interference. To this end, a cam 500 (Figs. 1 and 2), is preferably provided on the upper rail 4 of the guideway in position to strike contacts comprising the anti-friction rolls 88 of the carrier and force these rolls together with the carrier outwardly as the carrier reaches the end of the tractor roll. Preferably this cam 500 extends continuously around the end of the machine, ending at a corresponding point on the opposite side. At this point the anti-friction rolls 88 leave the cam and the spring 87 is enabled to pull the carrier toward the tractor roll so that the tires 70b of the traverse cam are engaged thereby and traverse of the yarn is initiated. This arrangement of parts thus constitutes means for shifting the position of the traverse cam with respect to its driving means in accordance with the movement of the carrier.

For the purpose of preventing the tires 70b of the traverse cam from being caught by the ends of sections of the tractor rolls at the joints between sections, a cam 501 (Fig. 26) is preferably provided on the rail 4 at such points, the length of this cam preferably being such that only one of the anti-friction rolls 88 is forced outwardly away from the tractor roll at a time. Since, in the illustrated form of carrier, the distance between the anti-friction rolls 88 approximates the distance between the two tires of the traverse cam, this action of the cam 501 results in each tire 70b of the traverse cam being forced away from the tractor roll as it reaches a joint between sections of the roll and being allowed to return into contact with the tractor roll while the other tire of the cam is being driven by the roll. In this way the tires are held against striking the end faces of the rolls in passing while the arrangement whereby only one tire is forced outwardly at a time insures that the tractor roll will be continuously driven in passing the joints.

*Supply package carriers.*—Provision is made to carry at least one supply yarn mass, by which term I intend to include a bobbin, skein, spool or the like, on each carriage 10. In the preferred operation of the machine, a supply (spinning) bobbin is exhausted on one passage around the machine and it is therefore provided to doff the supply bobbin prior to the second passage of the operator's end of the machine.

As best shown in Figs. 4 and 6, the plate 60 may be bored for a short shaft 120 carrying a cam arm 121 at the rear side of the plate and an L-bracket 122 at the front side of the plate, the shaft being eccentric to the plane of symmetry of the L-bracket, which therefore tends by gravity to hang down and rest against a pin 123 on the face of the plate 60, the arm 121 being normally in the full line position of Fig. 6. A spindle pin 122a is carried by the bracket 122 and is adapted to fit loosely in the bore of a supply bobbin B, normally holding the bobbin upright in position to feed its yarn Y through the gate 114.

Suitably mounted on one of the frame members of the machine is a bracket 125 which is provided with a pin 126 (Figs. 4 and 6) adapted to engage the arm 121 as the carriage moves along its path and thereby to turn the arm and bracket 122 to the posiiton shown in broken lines in Fig. 6, and in full lines in Fig. 5.

The pin 126 is located on the machine somewhat beyond the normal point of exhaustion of the bobbins B and the spent bobbins are doffed by gravity when the bracket 122 is turned upside down at this place, where they may be received in a receptacle or on a conveyor.

Devices for stopping the driving of the winding mass and/or shifting the position of the winding mass preparatory to replenishment and similar operations on the yarn It is desirable for several reasons to provide for stopping driving of the winding mass at certain times; for example in preparation of any selected carrier for replenishment operations, which operations may include splicing a broken strand and/or substitution of a replenishment bobbin for an exhausted bobbin or substitution of an empty tube for a full package,—such operations necessitating the stoppage of the rotation of the winding mass. Likewise it is desirable in preparation for these replenishment operations to shift the position of the winding mass so as to present the wound package and/or the strand of yarn leading thereto in more convenient position with respect to an operator or automatically actuated replenishing devices. In the present embodiment of the invention, cessation of driving the winding mass is accomplished by swinging the package carrying arm 71 to the right from the position of Fig. 4 to the position of Fig. 5, which at the same time accomplishes the result of presenting the package and strand in a more convenient position for replenishment operations. It will be understood however that my invention is not limited to the joint accomplishment of these results of stoppage and of shifting the winding mass but that on the contrary the invention contemplates accomplishing either of these results severally. For the purpose of effecting such stoppage of the winding mass and change in its position, the present invention provides shifting means operating as a consequence of travel of the carriers along the guideways to swing the package carrying arms 71 by the application of force derived from the relative movement of the carrier and guideway. To this end suitable shifting connections herein shown (Fig. 4) as a crank arm 300, a lifter link 301, a crank 302 fast on a shaft 303, and a dog 304 pivotally mounted at 316 on the shaft 303 are provided, the dog 304 being adapted to engage some fixed or normally stationary abutment on the machine as the carrier passes. In the embodiment of the invention illustrated in Figs. 1 to 10 such an abutment is provided in the form of a long pin 307 (Figs. 4 and 5) extending horizontally from the rail 4 of the guideway, for instance at the point indicated by the reference character 307ª of Fig. 1. As the carriage reaches this point in its travel, the dog 304 contacts with the long pin 307 and as a consequence rotates shaft 303 and rocks the arm 302 to lift the rod 301 and swing the package carrying arm 71 outwardly from the guideway to the position shown in Fig. 5. By the provision of the pin 307 at a point near the end of the tractor roll 51, the winding package is automatically disengaged from the tractor roll somewhat before the end of the roll is reached. The wound package is thereafter carried around the semicircular end of the machine in position for the wound package and free strand of yarn to be subjected to replenishment operations.

It is preferred to provide for a separation of the normally closely disposed spindles of the machine, to provide for ease of doffing or donning winding packages or cores. In the form of machine illustrated in Fig. 1, the curved end portion of the guideway has the radius of an arc tangential to the two opposite straight portions of the guideway. It will now readily appear that the preferred outward swinging of the package-carrying arms 71 to the position of Fig. 5 is especially useful in causing the spindles to travel around the curved end of the machine in a path of substantially greater radius than that of their guideway, as shown in Fig. 1. With the arc of travel of the endwise-moving spindles thus increased, adjacent spindles are thereby separated in the direction of their travel a substantial amount, which as indicated in Fig. 1 is sufficient to provide between adjacent spindles a space adapted to accommodate a full package during doffing. When any full package reaches the curved end of the machine, such full package can readily be slipped off its spindle endwise into the space provided by the separation of adjacent spindles, even though the winding spindles are normally so closely disposed that there is very little space between them during travel along the straight portions of the guideway.

Thus, as illustrated herewith the means for separating the adjacent spindles may utilize the described mechanism for outwardly swinging the several packages. As will appear below, the outward swinging of individual packages may in some instances be brought about by the action of various forms of stop-mechanism acting as a consequenc of cessation of proper travel of the yarn.

*Stop mechanism acting as a consequence of cessation of proper travel of the yarn.*—In case of cessation of proper travel of yarn to the winding mass it is desirable that the winding mass be removed from the tractor roll in order to prevent subsequent wear of the wound yarn by continued abrasion of the outer layers of yarn by the tractor roll, as well as for the purposes of presenting the wound package and free end of yarn in convenient relation to the operator or to automatically actuating replenishment devices. In the illustrated embodiment of the invention, wherein replenishment is effected at one end of the machine, it is highly desirable to effect an immediate shifting of the wound package to the position in Fig. 5 upon such cessation of proper travel of the yarn, for the described reason of preventing damage of the wound package before the end of the machine is reached. In the preferred forms of the invention illustrated, this is accomplished by the utilization of the previously described dog 304 and its connections to the package carrying arm 71, to lift the package carrying arm 71 upon cessation of yarn travel occurring at intermediate points along the path of the carrier.

Referring to Fig. 6, the yarn Y traveling in tensioned condition to the winding package is preferably subjected to the slight added tension of a feeler 310, herein shown is a rectangular wire bail whose parallel arms have pivots mounted in opposite lugs 312 (Fig. 5) which depend from the cover plate 110 of the carrier. This wire bail has a depending leg 312ª connected by means of a link 314 to the dog 304 which is pivotally mounted upon shaft 303 to swing about an axis transverse to the axis of rotation of the shaft 303. Referring to Fig. 4, the tension introduced in the yarn Y by the rotation of the winding mass is sufficient to hold down the feeler 310 and cause the connecting link 314 normally to hold the dog 304 in an outwardly inclined position. The weight of the dog 304 however is such that upon cessation of proper travel of the yarn resulting for example from diminution of tension between the winding mass and the tensioning device guides, slub catchers or the like hereinafter described, or absence of a strand of yarn on its way to the winding package, resulting for example from breakage or exhaustion, dog 304 will drop to a vertical position and swing the feeler 310 upwardly to the position of Fig. 5. In order to effect stoppage of winding and the desired shifting of the position of the yarn mass upon such an occurrence, a plurality of pins 318 (see Figs. 4, 2, and 18) are provided at suitable intervals along the rail 4, these pins being of such length that during normal winding as in Fig. 4 the dog 304 freely passes these pins. When the dog 304 drops to the vertical position as a result of cessation of normal travel of the yarn, the dog 304 engages the next pin 318 which the carriage 10 passes, and continued movement of the carriage swings the dog in the same manner as is done by the above described pin 307, moving the package carrying arm 71 to the position in Fig. 5 thereby both stopping the rotary driving of the winding mass and shifting the winding mass to a convenient position for the replenishment operation.

Referring to Fig. 4, the previously described pin 307, intended to operate upon all carriers which reach this pin in winding position, is sufficiently long to engage the dog 304 whether in vertical position or in the normal inclined position which it occupies when the yarn is being normally wound.

*Initiation of winding.*—After passage around the semi-circular end of the machine, the winding packages, whether partially wound or empty, are again caused to rotate for winding, in the present instance by being swung into frictional engagement with the adjacent tractor roll. Preferred devices for accomplishing this result include as operative elements the rod 301, crank 302 and shaft 303 employed in lifting the wound package but in this instance actuated in a reverse direction to return the package to the position of Fig. 4. For actuating these parts in this manner another pin 320 (Fig. 5) projecting from the rail 4 similarly to pins 307 and 318 and located at the point indicated by the reference character 320a in Fig. 1, engages a part 321 (Fig. 5) projecting from the dog 304 on the opposite side of the pivot point 316 from the part of the dog which engages the pins 307 and 318 previously described. Thus after passing around the end of the machine shown in Fig. 1, all winding masses which may have been subject to replenishment are started again to wind, the winding continuing as the carrier moves along the tractor roll 50 either until the end of this roll is reached and a pin 307 causes the winding to stop, or until breakage or the cessation of proper travel of yarn occurs and one of the pins 318 causes the winding to stop.

*Control of initiation of traversing with respect to initiation of winding.*—When the winding package W is moved from its inactive position of Fig. 5 to its winding position of Fig. 4 by the mechanism described above incident to resuming winding of a package which is passed around the end of the machine, resuming winding after replenishment operations, or initiating winding of the new package, it is desirable that the package attain approximately its full speed before the traverse mechanism begins to lay the yarn in spiral windings; otherwise there is likelihood of the traversing mechanism operating at such a high rate with respect to rotation of the winding mass that the package will not be wound with its fullest strength.

It will readily be understood that the operation of the traverse mechanism may be delayed with respect to initiation of winding by continuing the cam 500 which controls the position of the carriage to such a point that the normal operations in the machine will result in resumption of winding before the traverse cam re-engages the tractor roll 50. Fig. 5 however illustrates a preferred arrangement of mechanism for delaying engagement of the yarn with the traverse mechanism until after winding has been begun.

Referring to this figure, a stop 503 in the nature of a cam is shown as affixed to the vertical face of the upper angle iron 4 at the point at which the dog 304 is rotated to swing the winding mass W into contact with the tractor roll 50, for the purpose of preventing the dog 304 from swinging about its axis 316 and allowing the feeler 310 to drop. Thus when this stop 503 is provided the tension exerted on the yarn Y by rotation of the winding mass W is unable to depress the feeler 310 and the feeler retains the yarn out of contact with the traverse eye 106, until the stop 503 has been passed. Preferably the stop 503 extends but a short distance past the point at which winding is resumed, so that as soon as the winding mass W has attained full speed the feeler 310 is enabled to drop and the yarn Y is engaged by the traverse eye 106 and thereafter traversed. The dotted line O in Fig. 5 indicates the relation between the feeler 310, traverse eye 106 and tractor roll 50 which obtains while the dog 304 is engaged by the stop 503, this relation being such that yarn passing over the feeler 310 is held above and free from the traverse eye 106.

*Tension.*—The form of the invention illustrated in Figs. 1 to 10 employs (in conjunction with the devices for winding and traversing the yarn Y) a tension device advantageously positioned between the slotted blade 115 which acts as a fixed guide for the yarn and the oscillating traverse eye 106. Between the points defined by the guide 115 and the traverse eye 106, the limiting positions of the oscillating run of yarn define a fan or V-shaped figure, diverging from the fixed guide 105. The tension device particularly shown in Figs. 4, 5, 6, 7, 9 and 10 is adapted to exert tension upon this oscillating yarn without interfering unduly with its freedom of oscillation. The parts for thus tens'oning the yarn are shown as comprising two intermeshing series, 322 and 323, respectively, of fingers carried respectively by shafts 322a and 323a which are mounted to turn in bearings upon the cover plate 110 of the carrier. The run of the yarn Y takes a sinuous course in passing between the fingers of the two series, and the friction thus produced tensions the yarn on its way to the winding mass C. As the traverse eye 106 operates, the yarn is able to slip longitudinally of the fingers in traversing its fan-like path, thus preventing local wear in the tension device.

*Tension device open.*—Since the replenishment operations (including yarn repair after breakage) may, in the described embodiment of the invention, be performed at the end of the machine shown in Fig. 1, the tension devices of all the carriers are preferably opened as they approach this end of the machine and at about the time at which the driving of the winding mass is stopped as explained above, so that when replenishment operations are performed, the tension devices will be open for easy insertion for the yarn Y. Preferred mechanism for accomplishing this result as a consequence of the attainment by the carrier of a predetermined position near the end of the machine, comprises lifter rods 330 (Figs. 4 and 6) operatively connected to crank arms 331 on the shafts 322a and 323a, and a stationary cam 332 (Figs. 4 and 5). This cam 332, which may conveniently be affixed to the rail 4 by a bracket 333, is preferably positioned at about the points indicated by the reference character 307 in Fig. 1 at which point the driving of the winding masses of the carriage is severally stopped. As a carrier reaches the cam 332 its lifter arms 330 severally engage the cam and are lifted thereby to rotate the shafts 322a and 323a outwardly to the position shown in Fig. 7, wherein they are free of yarn Y. The cam 332 may be continued for any desired distance along the path of the carriers at a level which retains the lifter arm 330 lifted and the tension device open. As the end of the cam is reached the lifter arms 330 severally drop.

*Devices adapted for cone winding; winding conical packages.*—Referring to Figs. 9, 10 and 11, the apparatus is shown as arranged for winding cones instead of cylinders, this rearrangement essentially necessitating merely the removal of the wooden cylindrical core employed in winding cylindrical packages, the affixation to the shaft 72 of a suitable cop-holder, and the adjustment of the angularity of the shaft 72 to enable the peripheral surface of a cop on the cop-holder to contact throughout its length with the tractor rolls 50 or 51. As previously explained, the angularity of the shaft 72 may be adjusted by loosening the bolt 71c (Fig. 4) and turning the forward part 71d of the package holding arm 71 to the proper angular position and thereafter tightening the bolt 71c.

A conventional form of cop-holder 331, shown in Fig. 10 and adapted to retain a paper cop tube 332, may be operatively associated with the shaft 72. In Fig. 10 the tension device is shown as belonging to the genus of devices shown in Figs. 4, 5, 6, and 7 and having parts which correspond generally to the parts in these figures with the exception that in Fig. 10 one rotatable shaft 322a is omitted and the fingers 322 are fastened directly to the cover plate 110 of the carrier so that only shaft 323a and its associated fingers 323 are swung open and shut for the insertion of replenishment yarn. It will be readily understood, however, that either type of tension device may be used on either of the machines.

I have found that it is desirable in winding conical headless self-sustaining packages that the yarn be wound more tightly upon the small end of the cone than upon the large end, and that this manner of winding results in a package having greater strength and self-sustaining qualities than heretofore. The tension device of Fig. 10 is well adapted for this purpose. It will be understood, as indicated in Fig. 10, that during oscillation of the traverse eye 106 the yarn Y oscillates between the intermeshing elements 322 and 323. The tension elements 323, since pivotally mounted at 323a, yieldingly press upon the yarn Y during such oscillation and confine the yarn Y to a sinuous course. As the pivotal mounting 323a of the tension elements 323 is herein disposed at the side of the carrier adjacent to the small end of the cone being wound, the yarn Y approaches the small end of the cone and the pivotal axis of the tension elements 323 simultaneously. Thus as the yarn Y approaches the small end of the cone the lever arm of the force exerted by the yarn against the tension elements 323 becomes shorter, so that the pull of the winding mass on the yarn Y has less effect in swinging or raising the tension elements 323 and thus relieving the tension, than in winding upon the opposite large end of the cone. The tension elements 323, which intermesh with the tension elements 322, preferably intermesh to a greater extent at the side of the device nearest the small end of the cone so that the path of the yarn Y becomes increasingly sinuous as the yarn is oscillated toward the small end of the cone. This arrangement is clearly shown in Figs. 10 and 11. As a result the yarn is wound upon the small end of the conical package C' with a relatively high tension and upon the larger end of the conical package with a considerably less tension.

*Modification of doffing and tension devices.*—Figs. 12 to 14 inclusive illustrate a modification of the previously described carrier and corresponding parts therein are indicated by the reference characters previously employed. In these figures the supply bobbin B is indicated as being held by an unwinding holder 340 fastened to the carrier by means of bracket 341, the bottom end of the holder being normally closed by a gate 342 pivotally mounted on the carrier at 343 and adapted to be swung to an open position when the gate strikes a suitable projection 344 extending from the lower rail 5 of the guideway, for the purpose of doffing the supply bobbin at a predetermined point in the travel of the carrier in the same general way as described in patent to E. J. and W. G. Abbott No. 1,700,425.

In Figs. 12, 13 and 14 a generally cylindrical guide 347 is suitably affixed to the carrier 10 and is of sufficient diameter to admit the passage of a supply bobbin on its way into the holder 340. In this arrangement, the tension device employed is preferably varied from the form shown in the preceding figures, being located between the guide 347 and the supply holder 340 so that insertion of a fresh bobbin automatically places the yarn Y in a position to be received by the friction elements of the tension device. The tension device of Figs. 12 to 14 includes oppositely disposed series 322d and 323d of fingers supported at their ends by connecting rods 322e and 323e which are concentrically pivotally mounted on pivots 350 on opposite sides of the cylindrical guide 347. These rods 322e and 323e include bent extensions 322f and 323f respectively, carrying suitable counterweights 322g and 323g which normally tend to hold the opposed series of fingers 322b and 323b in intermeshing relations as shown in full lines in Fig. 14. Rearwardly extending arms 322h and 323h which are affixed to the extensions 322f and 323f respectively are adapted successively to engage a suitable cam 332a which generally corresponds to cam 332 of the previously described embodiments. Successive contact of the extensions 322h and 323h with the cam 332a results in spreading apart the opposed series of intermeshing fingers and releasing the tension upon the yarn Y. With this form of device the cam 332a which preferably is first contacted at about a point indicated by the reference character 307a in Fig. 1, (after reaching the point of its maximum throw) continues around the end of the machine to about the point indicated by the reference character 320a in Fig. 1 at which point the winding mass is again started to rotate and the tension is applied to the approaching yarn Y by the dropping of the fingers 322d and 323d into their full line positions in Fig. 14.

*A modified form of actuating dog; devices for governing initiation of winding.*—Referring to Figs. 18 and 19, a modification, applicable to the devices of the preceding figures, is illustrated for the purpose of explaining by way of example an improvement aimed to provide more perfect and facile performances of the functions of stopping winding of the winding mass, and/or shifting the position of the winding mass, in accordance with detected cessation of proper travel of the yarn or attainment by the carrier of a predetermined point in its path. In these figures parts which correspond to previously described parts are indicated by the same reference characters. In the devices of Figs. 18 and 19, the shaft 303 which forms a link in the chain of parts for shifting the package-carrying arm 71, (instead of being provided with the simple pivoted dog 304 of the previously described construction) is provided with an enlarged head 360 (Figs. 18 and 22) having thereon spaced projections 361 between which a light dog 362 is pivoted, said dog normally depending from the head 360 in the position shown in Fig. 19 during normal winding. This dog 362 is connected to link 314 in the same manner as the previously described dog 304 and is held by this link 314 during normal winding in the inclined position shown in Fig. 19 wherein the dog clears the spaced pins or abutments 318 which project from the guideway of the machine. As in the previously described embodiments, cessation of proper travel of the yarn toward the winding mass permits the feeler 310 to swing upwardly in a direction normally prohibited by the tension of the winding yarn, consequently allowing the dog 362 to drop to a vertical position wherein it engages and is swung by the next adjacent pin 318. In thus swinging, the dog carries with it the shaft 303 and operates the lifter link 301 to swing the winding package into its elevated position away from the tractor roll 50. Fig. 20 illustrates this operation and shows the parts in the position attained at the time the dog 362 has been swung by the stationary pin or abutment 318. The operation of this modified form of device to stop the winding and shift the position of the winding mass of a carrier upon reaching the beginning of the curved portion of the guideway is identical with the operation of the previously described embodiment, the long pins 307 which are disposed adjacent the ends of the tractor rolls 50 and 51 being long enough to engage the pivoted dogs 362 of any carriers which are winding and which attain these points.

In returning the winding masses into contact with a tractor roll it is advantageous to allow the packages to descend gradually without momentum so that the wound masses are not injured by falling hard against the tractor roll. The enlarged head 360 of the shaft 303 of this modified form of carrier is particularly adapted to control the lowering of the winding package. Referring to Fig. 21, an elongate cam 370, having oppositely disposed cam surfaces 371 and 372 is preferably affixed to the rail 4 of the guideway of the machine in place of the simple pin 320 employed in the previously described embodiments, and the enlarged head 360 of shaft 303 is provided with portions 374 and 375 which serve as cam followers. After the head 360 has been swung into the position shown in Fig. 20, cam follower surface 374 engages the cam surface 371 of the cam 370 for swinging the wound package in a direction opposite to that effected by contact of the dog 362 with the pin 318; thus the package is moved from the position of Fig. 5 counterclockwise past the center of rotation 73. At about this point, cam follower surface 375 engages the cam surface 372 as shown in Fig. 21, and the subsequent lowering of the winding mass as induced by gravity is governed by the restraining influence of the cam 372 upon cam follower surface 375. Fig. 21 shows diagrammatically succeeding positions of the head 360 and its cam follower surfaces in relation to the cam surfaces 371 and 372 which result in a final lowering of the winding mass into contact with the tractor roll 51.

*Improved traversing slider.*—The head or upper portion of the carrier of Fig. 18 is shown as provided with a traverse device improved as respects freedom from vibration and as respects capability of traversing the yarn at a point close to the nip or bite of the tractor roll 50 and winding package. These capabilities permit the speed of the traverse device (hitherto the limiting factor in winding) to be materially increased without detriment to the self-sustaining qualities of the resulting yarn package. Referring to Figs. 18 and 32, the head of the carrier is provided with a polished round steel rod 100ᵃ fastened to the opposite plates 66 and 67 by nuts 100ᵇ and constituting one guide for the slider 101ᵃ which carries a pintle 104ᵃ having revolubly mounted in its lower end a cam follower 105ᵃ engaging the cam groove of the traverse cam 70.

Referring to Fig. 18, it will be observed that the guide rod 100ᵃ occupies a vertical plane intermediate the vertical planes of the axes of the roll 50 and the traverse cam 70. The shape of the slider as viewed from the side in Fig. 32 may be characterized as generally triangular, the slider fitting within the approximately triangular space defined by the roll 50, the traverse cam 70 and the cover plate 110 of the cam. The slider, as shown in Figs. 32 and 33 is provided with a part 101ᵇ extending laterally from the guide rod toward the point of contact of the winding mass and tractor roll 50, this part carrying an upturned extension 106 comprising the slotted yarn-engaging traverse eye of the slider, and is also provided with a part 101ᶜ extending laterally from the guide rod opposite to part 101ᵇ. These laterally extending parts 101ᵇ and 101ᶜ are preferably flat on their upper surfaces, as shown in Fig. 33 to permit these parts to slide in engagement with the under surface of the cover plate 110 as shown in Fig. 32. The cover plate thus constitutes a key to prevent the slider from rotating on its guide rod 100ᵃ and also a guide relatively close to the bite of the tractor roll 50 and winding package to prevent vibration of the slider as the latter is traversed to and fro by the cam 70. The cover plate is preferably bent at 110ᵃ in a projecting angle in the path of the yarn, so that the yarn runs in contact with the cover plate from this point 110ᵃ until it leaves the cover plate at the traverse eye 106. The arrangement of parts whereby the slider 101ᵃ is kept in constant sliding contact with the cover plate 110 close to the traverse eye, insures that yarn passing over this portion of the plate will be picked up and traversed by the slotted traverse eye at high speeds of the eye which would cause undue vibration were the slider not thus guided.

*Braking the movement of the package-carrying arm.*—In the device of Figs. 18 and 19, the package-carrying arm 71 and its supporting parts are shown as modified to provide for retarding the swinging movement of this arm and its retained package. This is of particular utility in diminishing the tendency of a winding yarn mass to jump up and down on the rapidly turning tractor roll 50.

Referring to Figs. 18, 19 and 34, the side plate 66 of the carrier is shown as terminating in a split clamp 66ᵃ, adapted to retain a stationary pivot pin 66ᵇ of small diameter upon which one part 71ᵉ of the forked end of arm 71 turns. Lifter rod 301 is connected to this pivotally mounted fork 71ᵉ of the arm 71 as indicated in Fig. 19, so that movement of the lifter rod swings arm 71 about the pivot pin 66ᵇ. The pivot pin 66ᵇ is preferably provided with an enlarged head 66ᶜ of relatively large diameter, the peripheral surface of which constitutes a brake drum adapted to cooperate with another fork 71ᶠ (Fig. 19) of the arm 71. Referring to Fig. 18, this fork 71ᶠ preferably comprises a brake shoe, split at 71ᵍ to form two yieldable brake shoe portions 71ʰ and 71ⁱ which are preferably caused frictionally to engage the drum 66ᶜ by means of the spring 71ʲ acting through the adjustable bolt 71ᵏ. It will be observed that portion 71ⁱ of the split shoe is longer than the opposite portion 71ʰ; this has the effect of providing more braking friction as the arm 71 turns in the direction of the shorter portion 71ʰ than in the direction of the longer portion, since the brake shoe portion which follows the arm in its movement acts more efficiently to retard the arm than does the shoe portion which precedes the arm. Thus, as viewed in Fig. 18, the retarding action of the brake is greater in a clockwise movement of the arm 71, than in a counterclockwise movement, or is greater as the winding package moves away from the tractor roll than as the package approaches the roll. This inequality of retardation is effective in suppressing the tendency of the winding package to vibrate under the influence of the rapidly rotating tractor roll.

To the end of further reducing vibration the free end of the arm 71 is preferably enlarged to constitute a weight 71ᵐ, to which if desired one or more other weights 71ⁿ may be detachably secured by a screw 71ᵖ. Preferably the enlarged end 71ᵐ of the arm is split at 71ʳ to permit the spindle 72 to be securely clamped therein by a machine screw 71ˢ.

*Modified form of tension device.*—A modified form of tension device, illustrated in Figs. 18 and 19, and in detail in Fig. 23, presents important advantages in facilitating insertion of yarn incident to replenishment or reestablishing the yarn supply, and further in offering but slight resistance to the passage of permissible imperfections.

This tension device, which is the subject matter of my copending application Serial No. 491,705 filed October 28, 1930, is designed frictionally to engage the passing yarn between two opposite plane surfaced tension members, here illustrated as discs 380 and 381. One of these tension members, 381, is yieldingly biased toward the other tension member 380 in a direction predominately opposite to the direction of movement of the yarn Y, but having also a component of motion transverse to the direction of yarn movement. In the illustrated form, this result is attained by constraining the tension disc 381 to movement in arcuate path, defined by an arm 382 pivotally mounted in a bushing 383 on the cover plate 110 of the carrier. A coil spring 384 cooperates with the arm 382 to force the tension disc 381 against the passing yarn. Preferably the connection between the pivoted arm 382 and the tension disc 381 is such as to permit tilting of the disc with respect to the arm to permit the disc 381 to conform to the surface of the opposed tension member, this connection being herein shown as a ball and socket joint comprising a ball 385 on the arm 382 and a cooperating annular enlargement 386 near the middle of tension disc 381. Tension disc 380 may be supported in any suitable manner, conveniently, as shown, by means of a supporting arm 387 adjustably fastened to the cover plate 110 by a screw 388, the arm having a loop 389 which encircles the annular enlargement of tension disc 380. Each of the tension discs is preferably provided with an outer rim 391, the rim being rounded at its junction with the yarn engaging plane surface of the disc so as to provide a throat for the easy insertion of yarn between the discs. This arrangement of parts provides a very delicate tensioning of the passing yarn, obtained by the floating of disc 381 in a position determined by the frictional drag of the yarn thereon and by the yielding of the spring 384. Preferably the stationary end of spring 384 is inserted in one of several holes 392 (Fig. 19) in the cover plate 110, the provision of a plurality of holes permitting adjustment of the tension to accommodate various yarns or speeds of winding. Permissible enlargements on the yarn are enabled to pass between the opposed tension discs without breakage as very little force is required, in addition to that normally exerted by the passing yarn, to swing the movable disc sufficiently to permit the enlargement to pass. The parts thus moved, namely the tension disc and arm 382, are intentionally made very light so as to have but a small moment of inertia, thus to prevent breakage of the yarn as enlargements are encountered by the two discs. The very light quick acting spring 384 insures that tension will be continuously applied to the passing yarn even in the case of the occurrence of numerous enlargements in the yarn.

The winding and unwinding carrier of the machine, and particularly its cover plate 110 is subject to considerable vibration due to the rapid rotation of the tractor rolls 50 and 51 and cam cylinder 70, as well as the rotation of the winding and unwinding masses of yarn. To prevent this vibration from interfering with the evenness of tension applied by the above described delicate tensioning device, for instance by setting up vibration of the arm 382 and disc 381 about the pivot point of the arm, this arm 382 is preferably extended to the opposite side of its pivot point as indicated at 382ᵃ and either alone or with the addition of a suitable adjustable weight 394 constitutes a mass which balances the tension disc 381 and the arm 382 about the pivot point of this arm. This has the effect of suppressing vibrations which would ordinarily be imparted to the arm and disc by the rapid rotation of the other moving parts of the device.

Referring to Fig. 19 the tension device of this embodiment is preferably so disposed that the plane defined by the opposed tension discs is transverse to the direction of movement of the carrier, in order to facilitate the insertion of replenishment yarn in the tension device by an operator or by automatically actuated replenishing devices stationed beside the path of the carriers. Suitable guiding means is preferably provided for causing the yarn Y to be inserted between the tension discs upon the initiation of rotation of the winding mass C, so that the operator or automatically actuated replenishing devices may merely lay the replenishment yarn in an approximate position on the guiding means and rely upon the subsequent movement of the yarn to feed the yarn between the tension discs.

In the device of Figs. 18 and 19 this guiding means comprises a pair of oppositely disposed wires 396 and 397 having their ends set in blocks 398 and 399 affixed to the depending vertical portion 110ᵃ of the cover plate 110 by stud bolts 398ᵃ and 399ᵃ, the intermediate portions of the wires being bent outwardly to the form of wings, each comprising a double width of wire and collectively defining a V-shaped guide or trough-like channel for centering yarn engaged thereby. The lower end portions of the two guide wires 396 and 397 lie close together and parallel at a point directly in front of the opposed tension discs, and from this point extend to the block 399 and together define a generally vertical entrance for properly centered yarn passing between the tension discs. The upper end portions of the two wires 396 and 397 likewise converge somewhat above the tension device and extend generally horizontally to the block 398, thus defining between them a passage for the yarn from the tension device to the traverse eye 106. From a consideration of the relation of the wires 396 and 397 with respect to the unwinding spindle 122ª and the traverse eye 106, it will be apparent that the guide or trough-like channel formed by the diverging parts of these wires defines a projecting angle in the line of yarn travel to the traverse eye. This arrangement of parts is such that yarn laid over either of the guide wires 396 or 397 and operatively engaged by the reciprocating traverse eye 106 will be brought automatically into the vertical plane defined by the end portions of the two guide wires 396 and 397, and will be caused by the pull of the winding mass C upon the yarn to enter between the tension discs 380 and 381.

*Devices for breaking up ribbon wind.*—Winding machines for winding yarn into headless self-sustaining packages utilize an arrangement of parts which causes the supply yarn to approach the winding mass from directions which change at such rate with respect to successive angular positions of the winding mass that the yarn is laid in reversed spiral layers with cusps of these layers defining the end faces of the package. In the present instance this is accomplished by the devices described above comprising for example, the friction drive roll 50 which rotates both the winding package C and the cam cylinder 70, the latter operating a traverse eye 106 to alter the direction of approach of the yarn with respect to the winding mass.

In these devices the superposed reversed spirals of the wound yarn approach coincidence upon the attainment of certain instantaneous diameters of the winding mass. Quite obviously at certain ratios of diameters of the winding mass C of the present machine with respect to the tires of the traverse cam roll, adjacent superposed wound layers will tend to coincide radially of the wound mass so that the cusp at the end of one layer would overlie the cusp of a neighboring layer. Such phenomenon, usually termed "ribbon wind," results in a package having less than the desired self-sustaining qualities. To prevent occurrence of such undesired winding I prefer to provide for circumferentially varying the position of successive wound layers sufficiently so that for any diameter of the winding mass neighboring layers will not coincide. In the preferred form of the invention this function is accomplished by providing the drive roll 50 (Fig. 25) with slight differences in diameter which preferably form nodes of maximum and minimum diameter of which corresponding nodes are spaced apart approximately integral multiples of the distance between the two tires 70ᵇ of the cam roll. Fig. 25 illustrates these nodes on a greatly exaggerated scale, the nodes being herein shown as spaced apart the distance between the two tires. Referring to this figure, it will be obvious that the tires 70ᵇ of the cam roll, being spaced equally with the nodes representing the greatest and least diameters of the drive roll 50, will constantly contact with portions of the drive roll having equal diameters but will be driven slightly faster when contacting with the outermost diameters than when contacting with the lesser diameters. The winding package C, being wound with a straight edge, always contacts with one of the largest diameters of the roll 50 and hence is driven at constant speed. Thus in the preferred form of the device the speed of the traverse mechanism is varied automatically with respect to the linear velocity of the winding mass, the variation induced by the conformation of the roll 50 being sufficient to prevent exact coincidence of superposed wound layers. The prefered novel construction of the drive roll 50 is quite obviously not limited in usefulness to the particular form of traverse mechanism shown herein as any other traverse mechanism might be driven by roll 50 at such varying speed as to break up the undesired ribbon wind. Likewise, when the traverse mechanism derives its operating power from the roll 50 the provision of a roll with varying diameters is not limited in usefulness to cases wherein the winding mass is driven by this same roll; for instance the winding mass could conveniently be driven by driving means physically distinct from the roll.

*Stop motion device operative only upon the occurrence of a predetermined kind of yarn imperfection.*—The modified form of carrier shown in Figs. 18 and 19 includes mechanism for stopping the winding and shifting the position of the winding mass upon occurrence in the yarn of a long soft slub, as distinguished from short hard imperfections such as are often deemed permissible. For this purpose I provide a slub breaker utilizing the principles of my invention set forth in my copending application Serial No. 484,993, filed September 29, 1930. In the device herein illustrated the slub breaker is shown as comprising blades 400 and 401 of such width in the direction of yarn travel as to provide a deep throat for the passage of yarn on its way from the tension device to the traverse eye, and spaced a sufficient distance apart by means of adjustable shims 403, frictionally to engage enlargements in the yarn. As explained in my copending application Serial No. 484,993, just above referred to, the depth of the throat is sufficient to exert a considerable friction upon slubs which are long and soft, and in the present embodiment of the invention, the width of the throat is so adjusted as to render such friction sufficient to induce breakage between the winding mass and the slub breaker when such a slub passes into the throat. On the other hand short hard imperfections such as nibs which present only small areas to the opposed surfaces of the two blades 400, 401, exert little friction within the slub breaker and hence pass through the throat without causing breakage of the yarn. The depth of the throat is preferably sixteen to fifty or more times the width of the throat.

One of the blades, herein shown as the blade 400, is preferably provided with a groove 406 for the purpose of allowing accumulations of waste to fall out of the throat as the yarn Y is traversed back and forth by the traverse eye 106.

By positioning the slub breaker between the tensioning device and the traverse eye, and by providing a slub breaker which operates frictionally to engage and retain objectionable slubs, breakage of the yarn caused by the presence of a slub leaves the yarn retained by the slub breaker in position to be tied by the operator or by any suitable automatically actuated tying mechanism without the necessity for rethreading the broken end of the yarn through the tension device.

Upon the occurrence of breakage caused by the presence of an objectionable slub, as distinguished from a nib, the tension is relieved upon the portion of the yarn between the slub breaker and the winding mass, and thus the feeler 310 moves outwardly and in so doing permits the dog 362 to drop into a position wherein it will be engaged by the next adjacent pin 318 on the guideway to stop the winding and shift the winding mass as previously described.

Preferably the slub breaker just described is provided with an upper blade 400 so shaped as to render the device self-threading. Referring to the dotted lines $m$ and $n$ (Fig. 19) which indicate the normal limits of traverse of the yarn, it will be observed that the yarn traversing between the blades does not quite attain the free end of either of the blades. The upper blade 400, however, is provided with a beveled surface 400$^a$ disposed at such an angle to the limit $m$ of normal traverse of the yarn as to receive a strand of yarn which has been traversed across the outside surface of blade 400. The angularity of beveled surface 400$^a$ is also such that a strand thus received is forced down the beveled surface by the pull of the winding mass, so that the strand passes the free end of blade 400 and enters the throat of the slub breaker, where it remains until subsequent rethreading. This arrangement, whereby a strand of yarn laid upon the upper blade 400 is automatically threaded into the slub breaker facilitates the operation of yarn replenishment. Furthermore, upon replenishment or retying of the yarn, the device permits the yarn to travel for a certain distance before the yarn is threaded into the slub breaker. This length of yarn which is wound without passing through the slub breaker is short enough readily to be inspected for slubs at the time of tying the yarn, but is long enough so that the knot formed may pass over the slub breaker (instead of through the slub breaker) even though formed at a convenient operating distance therefrom.

*Modified form of slub catcher.*—Figs. 27 to 31 illustrate the application to the carrier of a modified form of slub-catcher adapted particularly to cooperate with the controlling devices of the carrier in causing shifting of the winding mass or stoppage of its rotation upon the occurrence in the yarn of a long soft slub as distinguished from a permissible nib. This modified form of slub catcher is described and claimed in my copending application, Serial No. 484,993 filed September 29, 1930. The slub-catcher of these figures is even more certain in its operation than the previously described opposed fixed blades 400, 401, since in this modified form the portions of the blades which define the yarn-receiving throat are arranged to approach upon being frictionally engaged by a slub, thus increasing the friction exerted on the slub and insuring breakage of the strand.

The slub-catcher of Figs. 27 to 31 preferably comprises a pair of blades 530 and 531 disposed side by side and having transversely bent portions 530$^a$ and 531$^a$, which define between them a yarn receiving throat 532, (Figs. 29 and 30), of narrow width and of much greater dimension in the direction of movement of the yarn. Preferably, as shown, the blades 530 and 531 are movably mounted between a pair of stationary blocks 535 and 536 on the cover plate 110 of the carrier, in position for the throat 532 to receive yarn passing between the guide wires 396 and 397. To facilitate insertion of the yarn strand Y in the throat of the slub-catcher, particularly by the centering action of the guide wires 396 and 397, the end portions of the opposed blades are preferably flared outwardly as indicated at 530$^b$ and 531$^b$.

To cause the blades firmly to grip a slub in the yarn, the blades are pivotally mounted to swing slightly upward in the general direction of yarn travel, the pivot points of the blades being so arranged that this upward swinging brings the throat portions 530$^a$ and 531$^a$ closer together. Thus in the illustrated embodiment two spaced pins 540 and 541 set into the blocks 535 and 536, pass through openings in the two blades, with pin 540, which fits rather closely in an opening 540$^a$ in blade 530, serving as a pivot for this blade 530, and pin 541, which fits in a similar opening in blade 531, serving as a pivot for blade 531. As shown, blade 530 is provided with an opening 541$^b$ of larger size than pin 541, to permit this blade to swing about pin 540. Likewise, blade 531 is provided with an opening 540$^b$ of larger size than pin 540, to permit this blade to swing about pin 541. The two blades are connected, adjacent to their throat portions, by a rivet 550 which passes through a slot 551 in blade 531.

In normal inactive position, the two blades lie approximately in the position shown in Figs. 29 and 27, supported at their lower edges by a pin 552 fast in the cover plate. The width of the throat is sufficient to permit short imperfections such as nibs and knots to pass through the throat without exerting sufficient friction to swing the blades to any marked extent. When, however, a slub passes between the throat portion of the blades as shown in Fig. 30, the blades are lifted upward by frictional contact with the slub until the throat portions approach to such an extent that the slub is firmly gripped. The pull of the winding mass upon the yarn then breaks the yarn, usually leaving the supply yarn retained by the blades in convenient position for tying-in operations accompanying removal of the slub. Upon breakage of the yarn, the devices previously described serve to stop rotation of the winding mass and to shift the winding mass to a convenient position for tying of the yarn strand.

*Connections and bearings for the tractor rolls.*—Fig. 24 illustrates a preferred arrangement of connection between adjacent sections of one of the tractor rolls 50, this connection being arranged to receive and retain a suitable anti-friction bearing having a housing particularly adapted to prevent interference with the operation due to the occurrence of wound-up masses of yarn at the bearings. Referring to this figure, the two adjacent sections of the tractor rolls 50 are connected by means of a short section of shaft 410 preferably comprising a separate piece threaded at both of its ends 411 into the adjacent tractor rolls, the threads being cut in such a direction that normal rotation of the tractor rolls tends to screw the rolls and their connecting shaft 410 together. The end face of each of the rolls is preferably cut out in annular form to provide the recesses 412 adapted to receive the bearing housing 413 which is fastened by suitable means 414 to the stationary guideway or frame of the machine. An inner race 416 of a suitable anti-friction bearing, herein shown as comprising balls 417 and an outer race 419, is clamped between opposite squared ends of the tractor rolls. By clamping the inner anti-friction bearing race between such squared ends of the sections of the roll, a good alignment of the roll is secured. With this arrangement the outer race 419 of the ball bearing is frictionally engaged by the inner cylindrical surface of the bearing housing 413. Opposite ends of the bearing housing are preferably provided with annular guards 420 for the purpose of protecting the ball bearings 417 from dirt or waste, the housing including its guards thus having an approximately C-shaped section. In the preferred embodiment shown, the outer surface of the bearing housing 413 is of cylindrical form, so that waste which becomes wound around this housing will not tend to slide off into the cutout portions of the tractor rolls 50 (as would occur if the housing sloped toward the axis of the tractor roll at either edge of the housing) but will tend to build up in the open space between the ends of the rolls.

Obviously the occurrence of breakage adjacent to the periphery of the winding mass presents an opportunity for the strand of yarn Y to become engaged by the tractor roll 50 and wound thereon instead of upon the winding mass C. When such a condition arises the traveling movement of the carrier tends to work the yarn along the tractor roll until the joint between the two sections of the roll is reached, whereupon the yarn becomes wound around the stationary bearing housing 413. After a few turns around this housing the continued rotation of the tractor rolls causes the yarn to break. Since the outer surface of the bearing housing 413 is cylindrical, as described, the mass or bung of yarn thus formed remains upon the outer surface of the housing rather than sliding down into the inner portion of the bearing.

For the purpose of cutting such a bung from the main strand of yarn Y leading from the unwinding mass, a small clip 416 (Fig. 18) is provided near the left-hand end of the cover plate of the carrier. This clip 416 is so positioned that the free end of the yarn Y leading from the unwinding mass will not again be drawn onto the tractor roll 50. The free end may be retied in the same manner as in the case of any other breakage or exhaustion, whereupon the usual winding may continue.

It should be understood that the present disclosure is for the purpose of illustration only and that this invention includes all modifications and equivalents which fall within the scope of the appended claims.

I claim:

1. A textile machine having therein a carrier for a winding mass of yarn, means for moving the carrier in a predetermined path, means for winding yarn on the winding mass during such motion to form a traverse wound self-sustaining headless package or cheese by overlapped layers of reversed spiral windings, a stationary contact, a cooperating movable contact on the carrier and shifting means, operable by engagement of the movable contact with the stationary contact as the carrier moves, for shifting the wound yarn mass from normal winding position to another position, said movable contact being mounted on the carrier for movement with respect thereto by the forward motion of the carrier applied by engagement of the two contacts.

2. A textile machine having therein a carrier for a winding mass of yarn, means for moving the carrier in a predetermined path, means for winding yarn on the winding mass during such motion to form a traverse wound self-sustaining headless package or cheese by overlapped layers of reversed spiral windings, stationary contacts disposed adjacent to the path of the carrier, a cooperating movable contact member on the carrier, and controlling means for the yarn mass operable by engagement of the movable contact with a stationary contact to shift the wound yarn mass from normal winding position to another position and operable in the reverse direction by engagement of the movable contact with another stationary contact to return the wound yarn mass to its normal winding position.

3. A textile machine comprising a guideway, a plurality of carriers adapted to move in a path defined by the guideway and means for thus moving the carriers, means for supporting a winding and an unwinding mass of yarn on each of said carriers, means for driving the winding yarn masses, stop means associated with each carrier including a dog adapted to initiate actuation of the stop means, a plurality of stationary abutments disposed along the guideway and adapted to contact with and move the dogs of the carriers, means on each carrier responsive to proper travel of yarn from the unwinding to the winding mass of yarn for preventing contact of the dog with said abutments whereby the winding mass is not stopped by the action of said abutments if the yarn is winding properly, and means for actuating the dogs of all winding carriers which reach a predetermined point on the guideway to stop the winding on these carriers.

4. A textile machine comprising a guideway, a plurality of carriers adapted to move in a path defined by the guideway and means for thus moving the carriers, means for supporting a winding and an unwinding mass of yarn on each carrier, means for driving the winding yarn masses, means, including a detector on each carrier, contacts at intervals along the guideway and cooperating contacts carried by the carriers, for stopping the driving of the winding yarn masses of individual carriers upon the cessation of proper travel of the yarn of the carrier, and means for stopping the driving of the winding masses of carriers severally as they reach a predetermined point on the guideway.

5. A textile machine comprising a guideway, a plurality of carriers adapted to move in a path defined by the guideway, and means for thus moving the carriers, means for supporting a winding and an unwinding mass of yarn on each of said carriers, means for winding yarn on the masses during movement of the carriers to form traverse-wound self-sustaining packages or cheeses, stop means associated with each carrier for stopping the winding mass on that carrier, means for actuating said stop means upon cessation of normal travel of yarn to the winding yarn mass, and means for causing actuation of the said stop means of successive carriers as the carriers reach a predetermined point on the guideway.

6. A yarn handling machine comprising a guideway and a movable carrier thereon, means for moving the carrier along the guideway, a tractor roll for driving a winding mass of yarn, a support on the carrier for said yarn mass, said support including an arm mounted to swing on a pivot on the carrier to permit the yarn mass to contact with the tractor roll and be driven thereby and in another position to be supported free of the roll on the opposite side of the pivot, means carried by the carrier and adapted to cooperate with the arm to transmit motion thereto for swinging the arm about its pivot, and means at a predetermined place in the path of travel of the carrier for actuating the carrier-carried arm-swinging means at said place, said carrier-carried arm-swinging means and said actuating means being constructed and arranged to cooperate while the carrier is in motion past the actuating means.

7. A winding machine having therein a guideway and a movable carrier thereon, means for moving the carrier along the guideway, means, including an arm pivotally mounted on the carrier for holding a winding yarn package, means for rotating the winding package, means carried by the carrier and adapted to cooperate with the arm to transmit motion thereto for swinging the arm about its pivot, and means at a predetermined place in the path of travel of the carrier for actuating said carrier-carried arm-swinging means at said place, said carrier-carried arm-swinging means and said actuating means being constructed and arranged to cooperate while the carrier is in motion past the actuating means.

8. A yarn handling machine comprising a guideway and a movable carrier thereon, means for moving the carrier along the guideway, a tractor roll for driving a winding mass of yarn, a support on the carrier for said yarn mass, said support including an arm mounted to swing on a pivot on the carrier to permit the yarn mass to contact with the tractor roll and be driven thereby and in another position to be supported free of the roll on the opposite side of the pivot, and actuating means for causing the yarn mass to swing into contact with the tractor roll, said actuating means comprising a stationary abutment associated with the guideway, a dog carried by the carrier and adapted to engage the abutment in passing and to be moved by contact therewith, and a connection between said dog and the swinging arm, whereby movement of the dog swings the arm.

9. A yarn handling machine comprising a guideway, a carrier for a winding yarn mass adapted to move along the guideway, a stationary abutment on the guideway, means on the carrier for shifting the position of the winding yarn mass, said means including a contact member adapted when in one position to engage the abutment and by relative movement of the carriers and abutment to shift the yarn mass, and means operative in response to the normal yarn tension of the winding yarn to keep said contact member out of abutment engaging position.

10. A yarn handling machine including a guideway and a carrier thereon, means for moving the carrier, means for winding a mass of yarn on the carrier including a friction drive roll disposed adjacent to the path of travel of the carrier and adapted to drive the mass of winding yarn, abutments at intervals on the guideway, and means, including a member engageable with any one of said abutments, for causing the movement of the carrier to shift the winding mass away from the drive roll upon cessation of proper travel of yarn to the winding mass, said last-named means including a yarn detector and means for keeping said member out of contact with said abutments during proper winding.

11. A yarn handling machine having thereon a movable carrier for moving a winding mass of yarn in a predetermined path, means for winding yarn on the mass during such motion, a detector member mounted on the carrier and responsive to cessation of proper travel of the yarn to the winding mass, a dog which, when said detector responds to cessation of proper yarn travel, moves into position to contact with and be moved by a fixed part of the machine as the carrier moves, and a connection between said dog and the winding mass for moving the winding mass upon actuation of the dog.

12. A yarn handling machine including a carrier for a winding mass of yarn, guiding means therefor and means for moving the carrier in a path defined by the guiding means, means for winding yarn upon the mass during such motion, a member carried by the carrier and responsive to cessation of proper travel of yarn to the winding mass, a dog actuable by said member, a member fixed with respect to the guiding means and positioned to contact with and to react upon the dog to move the dog when the latter is actuated by the yarn responsive member, and a connection between the dog and the winding mass for changing the position of the winding mass upon movement of the dog by the fixed member.

13. A textile machine comprising a movable carrier, an endless guideway for the carrier, said guideway comprising straight portions and curved portions, tractor rolls associated with certain at least of the straight portions of the guideway, a movable support on the carriage for a winding yarn mass, said support normally occupying such a position on the carriage as to cause the yarn mass to engage and to be rotated by the several tractor rolls in succession as the carriage moves along the guideway, means for shifting the support to carry the yarn mass away from the peripheral surface of a tractor roll on its approach to the end of the latter, the yarn mass remaining out of normal position as the carriage traverses the curved part of the guideway, and means for slowly restoring the support to normal position as the carriage reaches the succeeding straight portion of the guideway.

14. A textile machine comprising a plurality of tractor rolls, a carrier movable longitudinally of said rolls in succession, a movable support on the carrier for a winding yarn mass, said support normally being so positioned that the peripheral surface of the winding mass contacts with successive rolls so as to be rotated by the latter, means on the carrier for lifting the yarn mass away from one roll as the mass approaches the end of the latter, and for holding it in lifted position until it reaches the next roll, and means for dropping the yarn mass at a controlled speed into contact with said latter roll.

15. A textile machine comprising a plurality of rotary tractor rolls having their ends spaced apart, said rolls being adapted successively to engage and rotate a winding yarn mass, means for transferring the mass from one roll to another, and means for shifting the mass to an inoperative position away from the peripheral surface of a roll as it approaches the end of the latter, and for restoring it at a controlled speed to operative position after it has safely reached a position for contact with the peripheral surface of the next roll.

16. A textile machine comprising a rotary elongate tractor roll, bearings for the roll, a carriage movable longitudinally of the roll, a movable yarn package support on the carriage, said support normally being so positioned that the yarn package rests against the peripheral surface of the tractor roll so as to be driven thereby, and means operable by the forward movement of the carriage for moving the support as the carriage approaches the tractor roll bearings, whereby to avoid contact of the package with said bearings.

17. A textile machine comprising a guideway, a carrier for winding and unwinding yarn masses, means for moving the carrier along the guideway, means for rotating the winding mass during such movement to wind yarn thereon, a detector on the carrier responsive to cessation of travel of yarn to the winding mass, and means rendered operative by actuation of said detector for causing the subsequent movement of the carrier to shift the position of the winding mass with respect to the carrier.

18. A textile machine comprising means for winding yarn on a winding mass of yarn, conveying means for moving the mass in a predetermined path during such winding, a detector traveling with the mass and responsive to cessation of travel of yarn to said mass, and means actuable by said conveying means for shifting the position of the mass upon the detection of such cessation of yarn travel.

19. A textile machine comprising means for winding yarn from an unwinding yarn mass onto a winding yarn mass, conveying means for moving the masses in a predetermined path during such winding, a detector movable with the masses and in continued contact with the strand of yarn traveling between said masses, thereby to detect breakage or exhaustion of the strand, and means actuable by said conveying means for shifting the position of one of said masses upon the detection of exhaustion or breakage.

20. A textile machine comprising a guideway, a carrier for a winding mass of yarn adapted to move along said guideway, a traverse cam rotatable on an axis fixed with respect to the carrier, a follower for said traverse cam carried by said carrier, drive means disposed along the guideway for driving the traverse cam, and cam means for moving the carrier and traverse cam as a unit away from said drive means to stop driving of the traverse cam, whereby movement of the traverse cam away from the drive means does not alter the relative position of the traverse cam with respect to the follower path.

21. A textile machine having therein a guideway, a plurality of carriers movable thereon, a rotary traverse cam on each carrier, traverse-cam driving means along which the traverse cams of the several carriers move and derive their rotary motion, in combination with a cam element located at a predetermined place in the path of travel and adapted to move and hold the several successive carriers bodily outwardly to disconnect their several traverse cams from said driving means, the axes of the several traverse cams being fixed with respect to their respective carriers.

22. A textile machine having therein a guideway, a plurality of carriers movable thereon, a rotary traverse cam on each carrier, traverse-cam driving means along which the traverse cams of the several carriers move and derive their rotary motion, in combination with a cam element located at a predetermined place in the path of travel and adapted to move and hold the several successive carriers bodily outwardly to disconnect their several traverse cams from said driving means, the axes of the several traverse cams being fixed with respect to their respective carriers, and yielding connections between the several carriers and the guideway acting to urge the carriers toward said traverse-cam driving means.

23. A textile machine comprising a carrier for winding and unwinding yarn masses, means for moving the carrier in a predetermined path, a tractor roll for driving the winding package, movable package-holding means for supporting the winding package in position to be driven by the tractor roll or alternatively in a position free of the roll, a cam, a cam follower on the carrier, said cam follower being engageable with the cam as the carrier moves, and operative connections between the cam follower and the package-holding means, the cam and cam follower being arranged with respect to each other to move the winding package toward the tractor roll when the carrier reaches a predetermined point in its path.

24. A textile machine comprising a carrier for winding and unwinding yarn masses, means for moving the carrier in a predetermined path, a tractor roll for driving the winding package, a pivotally-mounted package-holding member on the carrier adapted to occupy a position wherein the winding package is driven by the tractor roll or alternatively a position wherein the winding package is free of the tractor roll, a cam, a cam follower on the carrier, said follower being adapted to contact with the cam as the carrier moves, and operative connections between the cam follower and the package-holding member so that said package-holding member and cam follower move in unison, said cam including a cam surface adapted to move the cam follower in a direction to move the winding package toward the tractor roll and including a cam surface adapted to react on the cam follower to retard the movement of the winding package toward the tractor roll.

25. A textile machine comprising a carrier for winding and unwinding yarn masses, means for moving the carrier in a predetermined path, a tractor roll for driving the winding package, means for moving a package of yarn into driving engagement with the tractor roll, and means, including a cam surface for retarding the movement of the package to prevent the package from striking the tractor roll unduly hard.

26. A textile machine comprising a carrier for winding and unwinding yarn masses, means for moving the carrier in a predetermined path, a tractor roll for driving the winding package, a cam having oppositely disposed cam surfaces, a cam follower on the carrier having cam follower surfaces adapted to contact with said cam surfaces respectively, and operative connections between the cam follower and a winding package for controlling the movement of the package toward the tractor roll, one of the cam surfaces being effective to initiate movement of the winding package toward the tractor roll and the other cam surface being effective to retard movement of the winding package toward the tractor roll.

27. A yarn handling machine comprising a guideway and a carrier thereon, means for moving the carrier along the guideway, a tractor roll, means on the carrier for supporting a yarn mass alternatively in a position to contact with said tractor roll to be driven thereby and in a non-winding position free of the roll to facilitate handling of the yarn mass, said supporting means including an arm pivoted on the carrier in position for gravity to be effective in retaining the yarn mass in either alternate position, means for swinging the yarn mass past the pivot point of the arm toward winding position, and cam means for preventing the yarn mass from dropping on the tractor roll with such undue force as would injure the yarn mass.

28. A textile machine comprising a carrier for winding and unwinding yarn masses, means for moving the carrier in a predetermined path, movable means for supporting a yarn package on the carrier in either of two alternate positions, a rotatable member on the carrier, and operative connections from said rotatable member to said package-supporting means, a relatively fixed abutment disposed adjacent to the path of the moving carrier, a second abutment disposed adjacent to the path of the carrier and a dog pivotally mounted on the rotary member to swing about an axis transverse to the axis of rotation of said rotatable member into and out of position for engagement with said first-named abutment, said rotatable member including a contact element adapted to engage said second abutment, engagement of the dog with one abutment turning the rotatable member in one direction, and engagement of the contact element with the other abutment turning the rotatable member in the opposite direction as the carrier moves relative to the abutment.

29. A textile machine comprising a carrier for winding and unwinding yarn masses, means for moving the carrier in a predetermined path, movable means for supporting a yarn package in either of two alternate positions, a rotatable member on the carrier and operative connections from said rotatable member to said package-supplying means, an abutment disposed adjacent to the path of the carrier for causing shifting of the package from one position to another, a cam disposed adjacent to the path of the carrier for controlling return of the package to its initial position, a dog pivotally mounted on the rotatable member to swing about an axis transverse to the axis of rotation of said rotatable member, means responsive to cessation of proper travel of yarn to the winding mass for controlling the position of said dog with respect to contact of the dog with the abutment thereby to cause rotation of said rotatable member and shifting of position of the winding mass upon cessation of proper travel of the yarn to the winding mass, said rotatable member including a cam follower element for engaging the cam to govern return of the winding mass to its previous position.

30. In a textile machine, a rotary tractor element, an arm for supporting a winding yarn mass in peripheral contact with said tractor element, a pivotal support for the arm thereby to permit movement of the arm to carry the yarn mass toward and away from the tractor element, and means for retarding movement of the arm toward the tractor element and for retarding to a greater extent movement of the arm in the opposite direction.

31. In a textile machine, a rotary tractor element, a rotatable arm for supporting a winding yarn mass alternatively in peripheral contact with said tractor element and free of said tractor element, a support for said arm, a brake drum on the support, a split brake shoe on the arm, and extending from said arm in opposite directions circumferentially of the drum, the part of the shoe extending in one direction being longer than the part extending in the opposite direction, and means for yieldingly pulling the extremities of the shoe toward each other to tighten the shoe about the drum.

32. A textile machine comprising means for moving a winding mass of yarn in a predetermined path, means for winding yarn on the mass during such motion, a control device for jointly controlling the movement of the mass of yarn and the winding of yarn thereon, and a control device for controlling the movement of the mass of yarn independently of stoppage of the winding.

33. A textile machine comprising a plurality of carriers for unwinding and winding yarn masses, means for circulating the carriers in a predetermined path, means for driving the winding masses to wind yarn thereon, a control device for jointly controlling the movement of the carriers and the winding of yarn on the winding masses, and a control device for controlling the movement of the carriers independently of stoppage of winding.

34. A textile machine comprising a plurality of carriers for unwinding and winding yarn masses, means for circulating the carriers in a predetermined path, means for driving the winding masses to wind yarn thereon, a control device for jointly controlling the movement of the carriers and the winding of yarn on the winding masses, and a control device, including a foot pedal, for controlling the movement of the carriers independently of stoppage of winding.

35. A textile machine comprising a rotary tractor roll, means for driving the roll, a yarn package-supporting carriage movable longitudinally of the roll, means for moving the carriage, and means under control of the operator for stopping the movement of the carriage without stopping the rotation of the tractor roll.

36. A textile machine comprising an elongate tractor roll, a yarn package carrier movable longitudinally of the roll, means for driving the roll and for moving the carriage, means for simultaneously stopping the roll and the carriage, and means for stopping the carriage without stopping the rotation of the tractor roll.

37. A textile machine comprising conveying means for moving a plurality of winding and unwinding yarn masses past an operator, means for driving the winding masses to wind yarn thereon during such movement and means including a pedal within reach of the operator for controlling said movement to permit the operator to stop and start said movement incident to performing replenishing operations with respect to winding yarn as the yarn masses reach the operator.

38. A carrier for winding and unwinding yarn masses adapted to move along a rail in a closed path, having straight and curved portions, the carrier including a horizontally disposed roller adapted to rest on the rail, a pair of vertically disposed rollers adapted to engage one side of the rail, a vertically disposed roller adapted to engage the opposite side of the rail and a yieldable connection between said last-named roller and the carrier for enabling the oppositely disposed rollers to engage the rail on both straight and curved portions of the path of the carrier.

39. A textile machine comprising a carrier for winding and unwinding yarn masses, means for moving the carrier in a predetermined path, a tractor roll formed in a plurality of sections and disposed along said path, a traverse cam on the carrier, said cam having spaced tires which engage the tractor roll as the carrier moves, and cam means for successively holding the cam tires away from the tractor roll as the tires reach the joints between sections of the roll.

40. A textile machine comprising a carrier for winding and unwinding yarn masses, means for moving the carrier in a predetermined path, a tractor roll formed in a plurality of sections and disposed along said path, a traverse cam on the carrier, said cam having spaced tires which engage the tractor roll as the carrier moves, means for yieldingly urging the traverse cam toward the tractor roll into driving contact therewith, contacts on the carrier spaced in the direction of travel of the carrier, and a cam disposed in position successively to strike these contacts as the tires of the cam roll approach the joint between sections of the tractor roll and to hold the corresponding tire of the traverse cam away from the tractor roll until after the tire has passed said joint.

41. A textile machine comprising a carrier for winding and unwinding yarn masses, means for moving the carrier in a predetermined path, a tractor roll formed in a plurality of sections and disposed along said path, a traverse cam on the carrier, said cam having spaced tires which engage the tractor roll as the carrier moves, means for yieldingly urging the portion of the carrier which carries the traverse cam toward the tractor roll to maintain the tires of the traverse cam in contact with the roll, rollers on the carrier spaced in the direction of travel of the carrier, and a cam disposed in position to move these rollers successively outwardly away from the tractor roll, thereby to hold the tires of the traverse cam successively away from the tractor roll as the tires pass the joint between sections of the tractor roll.

42. A textile machine comprising a carrier for winding and unwinding yarn packages, means for moving the carrier in a predetermined path, means for driving the winding package during such movement to wind yarn thereon, means for retaining the winding package alternatively in position to engage the driving means and in a position free of the driving means, a traverse device positioned in the path of yarn approaching the winding package during normal winding wherein the winding package is engaged by the driving means and adapted to be disengaged by the yarn when the winding package is moved to its other position, and means for holding the yarn out of the path of traversing motion of the traverse device until after the winding package has engaged the driving means, said yarn-holding means automatically permitting the yarn to move into said path of traversing motion after an interval of winding.

43. In a winding machine, a tractor roll for driving a winding package of yarn, means controlling the position of the said package for causing the engagement of the package with the roll, traverse means for laying yarn on the winding package in reversed spiral windings, and means for holding the yarn out of the path of traversing motion of the traverse means until after the package has begun to be driven by the roll, said yarn-holding means automatically permitting the yarn to move into the path of traversing motion of the traverse means after an interval of winding.

44. A textile machine comprising a carrier for winding and unwinding yarn masses, means for moving the carrier in a predetermined path, means for driving the winding yarn mass, to wind yarn thereon, means acting as a consequence of movement of the carrier for controlling the driving of said winding mass by the driving means, a traverse device adapted to lay the yarn on the winding mass in overlapped layers of reversed spiral windings and means for holding the yarn out of the path of traversing motion of the traverse device until after the winding mass has begun to be driven, said yarn-holding means automatically permitting the yarn to move into the path of traversing motion of the traverse device after an interval of winding.

45. A textile machine having therein a carrier for moving a winding mass of yarn in a predetermined path, means for winding yarn on the mass during such motion, traverse mechanism for the winding yarn, and means for driving the traverse mechanism at varying speeds during such motion.

46. A textile machine having therein a carrier for moving a winding mass of yarn in a predetermined path, means for winding yarn on the mass during such motion, a traversing device for causing the winding yarn to lie in overlapped layers of reversed spiral windings, and means for automatically varying the speed of the traversing device during movement of the carrier to prevent undue radial coincidence of successive spiral wound layers of yarn.

47. A textile machine adapted for traverse winding of yarn packages comprising means for causing winding and unwinding yarn masses to travel in a predetermined path, traverse mechanism for the winding yarn mass, and a tractor roll extending in the general direction of travel of the yarn masses and adapted frictionally to drive the traverse mechanism during such travel, said tractor roll having different diameters at various points along its length thereby to vary the speed of the traverse mechanism during travel of the yarn masses.

48. A textile machine having therein a carrier for moving a winding mass of yarn in a predetermined path, a tractor roll adapted frictionally to drive the winding mass of yarn as the latter moves along its path, means having a rotary element frictionally contacting with the drive roll for traversing the winding yarn to form overlapped layers of reversed spiral windings, the diameter of the tractor roll varying at points along its length thereby to vary the speed of the rotary element and prevent undue radial coincidence of successive spiral wound layers of yarn.

49. A textile machine comprising a carrier for a winding mass of yarn, and means for moving the carrier in a predetermined path, means including a traverse cam for causing the yarn to be laid on the winding mass in layers of reversed spiral windings, a tractor roll adapted to drive the traverse cam as the carrier moves, the diameter of the tractor roll varying at points along its length thereby to vary the speed of driving the traverse cam.

50. A textile machine comprising a carrier for a winding mass of yarn, and means for moving the carrier in a predetermined path, means including a traverse cam for causing the yarn to be laid on the winding mass in layers of reversed spiral windings, a tractor roll adapted to drive the traverse cam as the carrier moves, axially spaced tires on the traverse cam adapted frictionally to engage the tractor roll, the diameter of the tractor roll varying from point to point so as to form nodes of maximum and minimum diameter, corresponding nodes being spaced apart an approximately integral multiple of the distance between the tires of the traverse cam.

51. A textile machine comprising a carrier for a winding mass of yarn, and means for moving the carrier in a predetermined path, means including a traverse cam for causing the yarn to be laid on the winding mass in layers of reversed spiral windings, a tractor roll adapted to drive the traverse cam as the carrier moves, axially spaced tires on the traverse cam adapted frictionally to engage the tractor roll, the diameter of the tractor roll varying from point to point so as to form nodes of maximum and minimum diameter, corresponding nodes being spaced apart approximately the distance between the tires of the traverse cam.

52. A textile machine comprising a guideway, a carrier for winding and unwinding yarn masses movable along the guideway, a tractor roll for driving one of the yarn masses as the carrier moves along the guideway, said tractor roll comprising at least a pair of sections disposed end to end, a bearing housing disposed between the ends of adjacent sections of the roll, and extending within recesses in the end faces of the sections.

53. A textile machine comprising a guideway, a carrier for winding and unwinding yarn masses movable along the guideway, a tractor roll for driving one of the yarn masses as the carrier moves along the guideway, said tractor roll comprising at least a pair of sections disposed end to end, a bearing housing disposed between the ends of adjacent sections of the roll, a shaft connecting said sections of the tractor roll together and extending through the bearing housing, and an anti-friction bearing between said shaft and the housing, the anti-friction bearing including an inner race clamped between opposed end faces of the adjacent sections of the roll.

54. A textile machine comprising a guideway, a carrier for winding and unwinding yarn masses movable along the guideway, a tractor roll for driving one of the yarn masses as the carrier moves along the guideway, said tractor roll comprising at least a pair of sections disposed end to end, the opposed end faces of the adjacent sections of the roll having annular recesses, a bearing housing extending within the opposed recesses, an anti-friction bearing within the housing, and including an inner race, and a shaft within said inner race and connecting the adjacent sections of the tractor roll.

55. A textile machine comprising a guideway, a carrier for winding and unwinding yarn masses movable along the guideway, a tractor roll for driving one of the yarn masses as the carrier moves along the guideway, said tractor roll comprising at least a pair of sections disposed end to end, a bearing housing disposed between the ends of adjacent sections of the roll, an anti-friction bearing within the housing and a screw connection for holding the adjacent roll sections tightly together with a portion of the anti-friction bearing clamped therebetween.

56. A textile machine comprising a guideway, a carrier for winding and unwinding yarn masses movable along the guideway, a tractor roll for driving one of the yarn masses as the carrier moves along the guideway, said tractor roll comprising at least a pair of sections disposed end to end, a bearing housing disposed between the ends of adjacent sections of the roll, an anti-friction bearing having inner and outer races within the housing and a screw connection for holding the adjacent roll sections tightly together with the inner race of the anti-friction bearing clamped therebetween.

57. A textile machine comprising a carrier for winding and unwinding masses of yarn, means for rotating the winding yarn mass to wind yarn thereon from the unwinding mass, means for moving the carrier in a predetermined path during such winding, and means carried by the carrier, effective upon retention of the yarn strand by parts of the machine which do not partake of the movement of the carrier, for severing a strand thus retained from the unwinding mass.

58. A textile machine comprising a carrier for winding and unwinding masses of yarn, a drive roll for rotating the winding yarn mass to wind yarn thereon from the unwinding mass, means for moving the carrier along the drive roll, a bearing for the drive roll, a housing for the bearing, and a cutter on the carrier for severing the yarn strand in the event of formation by the yarn of a bung on the said bearing housing.

59. A yarn handling machine including a carrier for winding and unwinding masses of yarn, means for moving the carrier in a predetermined path, means for winding yarn on the winding mass, guide members between the winding and unwinding yarn masses, said guide members being adapted to receive the moving strand of yarn upon initiation of winding and to convey the strand under the tension induced by the winding means into a predetermined plane, and a tension device positioned to receive yarn thus guided into the said plane.

60. A winding machine comprising means for driving a mass of yarn to wind yarn thereon, means for holding a supply mass of yarn, a traversing element for traversing the yarn as the latter is laid on the winding mass, and a guide for the yarn between the supply mass and the traversing element, the guide including divergent elements, which form a trough-like channel for the yarn defining a projecting angle in the line of the yarn travel between the supply mass and the traversing element, and thereby to center a strand of yarn with respect to the supply mass and the path of the traversing element.

61. A winding machine comprising means for driving a mass of yarn to wind yarn thereon, means for holding a supply mass of yarn, a traversing element for traversing the yarn as the latter is laid on the winding mass, a guide for the yarn between the supply mass and the traversing element, the guide including divergent elements which form a trough-like channel for the yarn defining a projecting angle in the line of the yarn travel, between the supply mass and the traversing element, thereby to center a strand of yarn with respect to the supply mass and the path of the traversing element, and a tension device positioned to receive said strand of yarn when the strand is thus centered.

62. A winding machine comprising means for driving a mass of yarn to wind yarn thereon, means for holding a supply of yarn, a traversing element for traversing the yarn as the latter is laid on the winding mass, a tension device between the yarn supply and the traversing element, and a yarn guide comprising members diverging from opposite sides of the tension device and forming a trough-like channel which defines a projecting angle in a strand of yarn laid thereon, whereby the engagement of the strand by the traversing element causes the strand to be conveyed to the tension device.

63. Yarn guide for winding machines comprising a pair of wires bent so that the end portions of the one wire are disposed adjacent to and generally parallel to corresponding end portions of the other wire, thereby to define a narrow path for the passage of properly centered yarn, the intermediate portions of the two wires being bent outwardly in the form of wings each comprising a double width of wire, the two wings thus formed being inclined with respect to each other to form a trough-like channel for guiding yarn into the path defined by the end portions of the wires.

64. Yarn guide for winding machines comprising a pair of wires bent so that the end portions of the one wire are disposed adjacent to and generally parallel to corresponding end portions of the other wire, thereby to define a narrow path for the passage of properly centered yarn, the intermediate portions of the two wires being bent outwardly in the form of wings each comprising a double width of wire, the two wings thus formed being inclined with respect to each other to form a trough-like channel for guiding yarn into the path defined by the end portions of the wires, and a block into which adjacent ends of the wires are set, the block being adapted to be attached to the winding machine.

65. A textile machine comprising a carrier for conveying winding and unwinding yarn masses in a predetermined path, means for moving the carrier, means for winding yarn on the winding mass, a device between the unwinding and winding yarn masses for tensioning the winding yarn, and means for relieving the tension when the carrier reaches a predetermined point on its path.

66. A textile machine comprising a carrier for conveying winding and unwinding yarn masses in a predetermined path, means for moving the carrier, means for winding yarn on the winding mass, a pair of opposed tension members between the unwinding and winding yarn masses for imparting a tension to the winding yarn, and means for separating said tension members when the carrier reaches a predetermined point on its path.

67. A textile machine comprising a carrier for conveying winding and unwinding yarn masses along a predetermined path, means for moving the carrier, means for driving the winding mass to wind yarn thereon, a device for tensioning the winding yarn, and devices for preparing the carrier for operations incident to commencement or resumption of winding, comprising means for stopping the driving of the winding mass and means for opening the tensioning device.

68. A textile machine comprising a guideway, a carrier adapted to carry winding and unwinding masses of yarn along a path defined by the guideway, means for driving the winding mass to wind yarn thereon, a tension device on the carrier and means, including a substantially stationary abutment and a movable contact carried by the carrier for opening the tension device when the carrier attains a predetermined point in its path.

69. A textile machine comprising a guideway, a carrier adapted to carry winding and unwinding masses of yarn along a path defined by the guideway, means for driving the winding mass to wind yarn thereon, a tension device on the carrier, and means, acting as a consequence of movement of the carrier with respect to the guideway for controlling the tension device.

70. A textile machine comprising a guideway, a carrier for winding and unwinding yarn masses, means for moving the carrier along the guideway, means for driving the winding yarn mass to wind yarn thereon, a pair of tension elements on the carrier, means for holding the tension elements frictionally to engage the moving yarn, an abutment on the guideway, and means on the carrier and engageable with the abutment to be moved thereby for separating the tension elements when the carrier reaches a predetermined point on the guideway.

71. A textile machine comprising a guideway, a carrier for winding and unwinding yarn masses, means for moving the carrier along the guideway, means for driving the winding yarn mass to wind yarn thereon, a pair of tension elements on the carrier, means for holding the tension elements frictionally to engage the moving yarn, an abutment on the guideway, and means, comprising a cam disposed along a part of the guideway and a follower element on the carrier connected to one of the tension elements, for relieving, during a portion of the travel of the carrier, tension normally set up by the tension elements.

72. A textile machine comprising a guideway, a carrier for winding and unwinding yarn masses, means for moving the carrier along the guideway, means for driving the winding yarn mass to wind yarn thereon, control means acting as a consequence of travel of the carrier for causing cessation of driving of the winding mass and for thereafter initiating resumption of driving, a pair of tension elements on the carrier, means for holding the tension elements frictionally to engage the moving yarn, an abutment on the guideway, and means acting concomitantly with cessation of driving as induced the said control means, for causing a relief of tension normally set up by the tension elements.

73. A textile machine comprising a carrier for a winding mass of yarn, means for moving the carrier, means for winding yarn onto the winding mass, a package-retaining member on the carrier for a yarn supply package holder and means for inverting the package-retaining member to doff said holder.

74. A textile machine comprising a guideway, a carrier movable along the guideway, devices for winding a yarn mass on the carrier, a package-retaining member on the carrier for a supply package, an abutment associated with the guideway, and means on the carrier for inverting the package-retaining member, said means including a movable member actuable by contact with said abutment as the carrier moves.

75. A movable carrier for winding and unwinding yarn masses including a pivotally mounted bracket, and a spindle pin thereon for holding a supply package, and means for inverting the bracket and thereby doffing the supply package.

76. A winding machine having therein means for holding a conical winding package, quick-traverse mechanism for oscillating the approaching strand of yarn with respect to the winding package to cause the yarn to lie in overlapped layers of reversed spiral windings, guiding means positioned so that the oscillating yarn forms a fan-shaped figure in approaching the traverse mechanism, and tensioning means including opposed friction elements close to said guiding means acting on the oscillating yarn of said fan-shaped figure for providing a substantially greater tension toward the side of the figure which corresponds to the tip of the conical package than toward the side of the figure corresponding to the base of the conical package.

77. A textile machine having therein a guideway defining a closed path for carriers for winding yarn masses, opposite tractor rolls extending along the guideway to rotate yarn masses transported by such carriers, a shaft extending transversely between said tractor rolls and operatively connected thereto, whereby rotation of the transverse shaft turns the tractor rolls, means for driving the transverse shaft, and driving connections driven by said transverse shaft for moving the carriers in said path, said driving connections including a clutch whereby to permit rotation of the tractor rolls without moving said carriers.

78. A textile machine having therein a plurality of winding spindles, a guideway having opposed straight portions connected by a curved portion, means for moving said spindles generally endwise in a procession along said guideway, means for winding yarn packages on the spindles, traverse means for distributing the winding yarn on said packages, the spindles having a length appropriate to the stroke of said traverse means and being normally arranged so close together that there is not sufficient space between two adjacent spindles to accommodate a package determined by said traverse means, said firstmentioned means causing adjacent spindles to separate with relation to one another in the direction of their travel around the curved portion of the guideway sufficiently to provide between adjacent spindles a space adapted to accommodate a full package during doffing.

79. A textile machine having therein a plurality of winding spindles, means for winding yarn packages on said spindles, a guideway having opposite straight portions connected by a curved portion, conveying means for imparting a generally endwise motion to said spindles along said guideway, and means for moving the spindles outwardly transversely to the motion of said conveying means to enlarge the arc of travel of the spindles around the curved portion of the guideway.

80. A textile machine having therein a plurality of traveling carriers, and a winding spindle on each carrier, means for winding yarn packages on said spindles, a guideway for said carriers having opposite straight portions connected by a curved portion, each spindle being disposed with its axis approximately in the direction of travel of its carrier, means for moving said carriers in a procession along said guideway, and a connection between each spindle and its carrier permitting outward swinging of the spindle away from the guideway, while maintaining approximate alignment between the axis of the spindle and direction of travel of the carrier, thereby to permit substantial increase of space between adjacent spindles at said curved portion of the guideway.

81. A textile machine having therein means for rotating a winding strand package, means for traversing the winding strand, a stop mechanism including a movable strand-responsive detector element located to contact with the strand adjacent to the traversing means, and means for automatically temporarily holding the said detector element, in opposition to winding tension, in a position where the strand is thereby held out of the traversing means and thereafter automatically releasing the said element.

82. A textile machine having therein means for rotating a winding strand package, means for traversing the winding strand, a strand-contacting detector element, means for constantly yieldingly urging the detector element to rise, said element being located in such position relative to the traversing means that in its raised position a strand running over it to the package is held by said detector element out of the traversing means, and means for automatically temporarily holding the detector element in such raised position, in opposition to winding tension.

83. A textile machine having therein means for winding a strand onto a package, means for traversing the winding strand, means for driving the traversing means, means for starting winding of the package, and means acting automatically to connect the traversing means to its driving means at a sufficient interval after the start of winding to permit the package to attain approximately its full speed before traversing begins.

84. A textile machine having therein a drive roll for rotating a winding strand package, means for moving a strand package into contact with the drive roll to permit the package to be driven thereby, means for traversing the winding strand, and means for automatically establishing a driving relation between the roll and the traversing means at a substantial interval after operation of the means for moving the strand package into contact with the drive roll.

85. A winding machine having therein means for holding a conical winding package, quick-traverse mechanism causing the strand approaching the traverse mechanism to oscillate rapidly in the form of a fan-shaped figure, frictional tension elements having the characteristic of applying materially varying degrees of tension to yarn dependent upon the instantaneous direction of yarn contacting therewith, said tension elements being located to act on the yarn of the fan-shaped figure, and being disposed with relation thereto to apply the heaviest tension to the yarn at the side of the figure corresponding to the tip of the conical package.

86. A textile machine comprising in combination a winding package rotary driving element, a movable support adapted to hold a yarn package during winding thereon, said support normally being so positioned that a yarn package held thereby rests against the driving element so as to be rotated to wind, means for causing said support and winding package to travel during such winding, mechanism traveling with the support for moving the support in a direction such as to remove the package from contact with said package-driving element, non-traveling means adapted to cooperate with and actuate the traveling support-moving mechanism during travel of the latter, the traveling support-moving mechanism normally being out of cooperative relation to said non-traveling means, and means responsive to failure of the winding yarn for causing the traveling support-moving mechanism to be operatively associated with said non-traveling means.

87. A textile machine comprising in combination means for holding a winding package, means for causing said holding means and package to travel, means for rotating the package to wind thereon during such travel, and means for stopping winding including stop mechanism traveling with the winding package, non-traveling actuating means for the traveling stop mechanism normally not in operative association therewith, and detector means traveling with the winding package for causing operative association of the traveling stop mechanism with the non-traveling actuating means in the event of failure of the winding strand.

88. A textile machine having therein means for causing a winding package of yarn to travel in a predetermined path, friction driving means for rotating the yarn package by contact with its surface during such travel, traverse means traveling with the yarn package, and means operative during travel of the yarn package for alternately increasing and decreasing the speed ratio between the traverse means and the friction package-driving means, thereby to prevent undue radial coincidence of successive spiral layers of yarn on the package, the machine including a driving means for the traverse means arranged so that the traverse means travels relatively thereto.

89. A textile machine having therein means for causing a winding package of yarn to travel in a predetermined path, non-traveling friction driving means for rotating the yarn package by contact with its surface during such travel, traverse means including a rapidly reciprocating yarn-guiding element traveling with the yarn package for laying the yarn on the package at a substantial angle to the direction of rotation of the package, and means operative during travel of the yarn package for alternately increasing and decreasing the ratio between the mean reciprocating speed of said yarn-guiding element and the speed of said friction package-driving means, thereby to prevent undue radial coincidence of successive spiral layers of yarn on the package.

EDWARD J. ABBOTT.